Jan. 16, 1940.                R. E. FLANDERS                2,187,227
                              GRINDING MACHINE
                     Filed Oct. 25, 1935        24 Sheets-Sheet 2
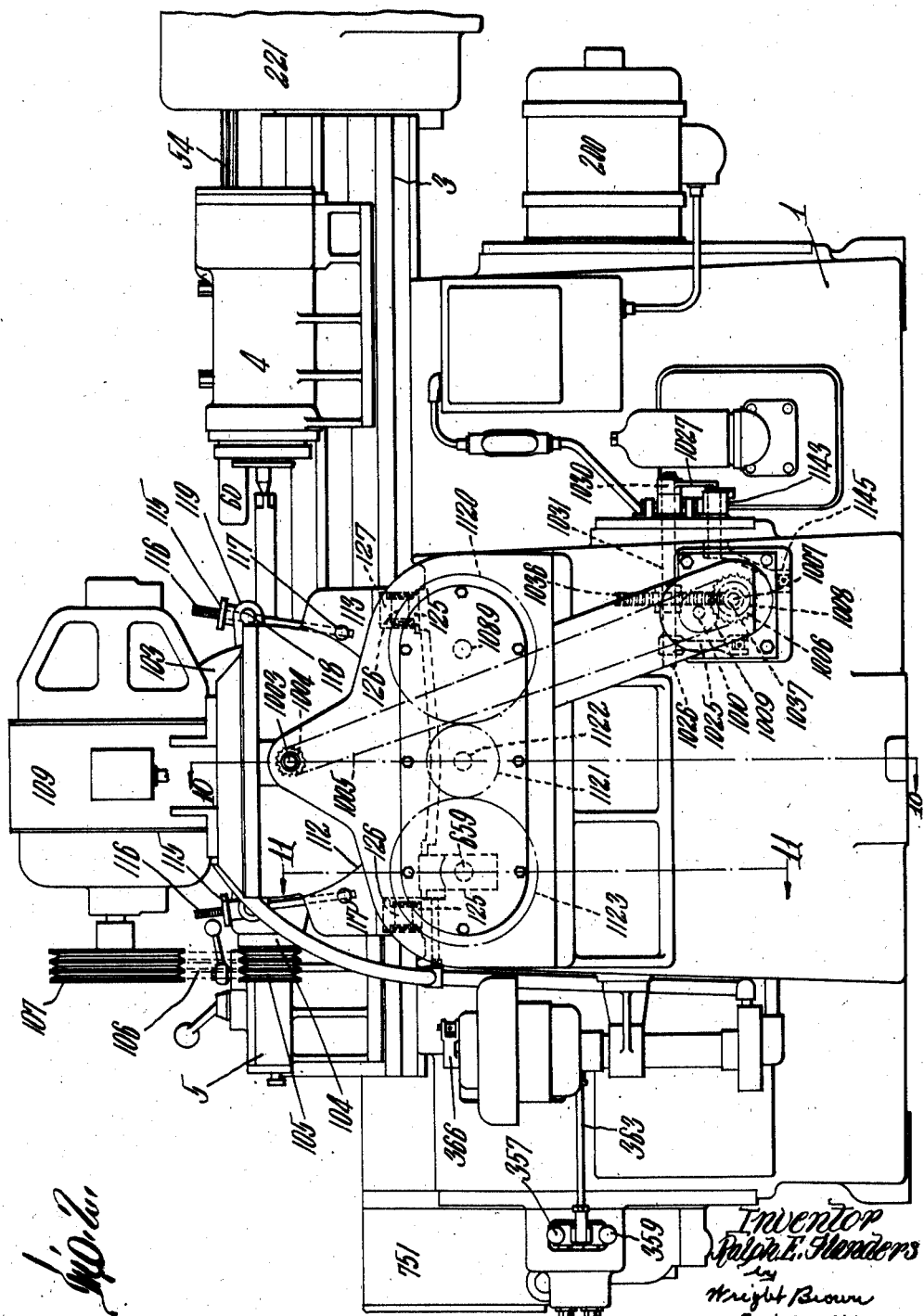

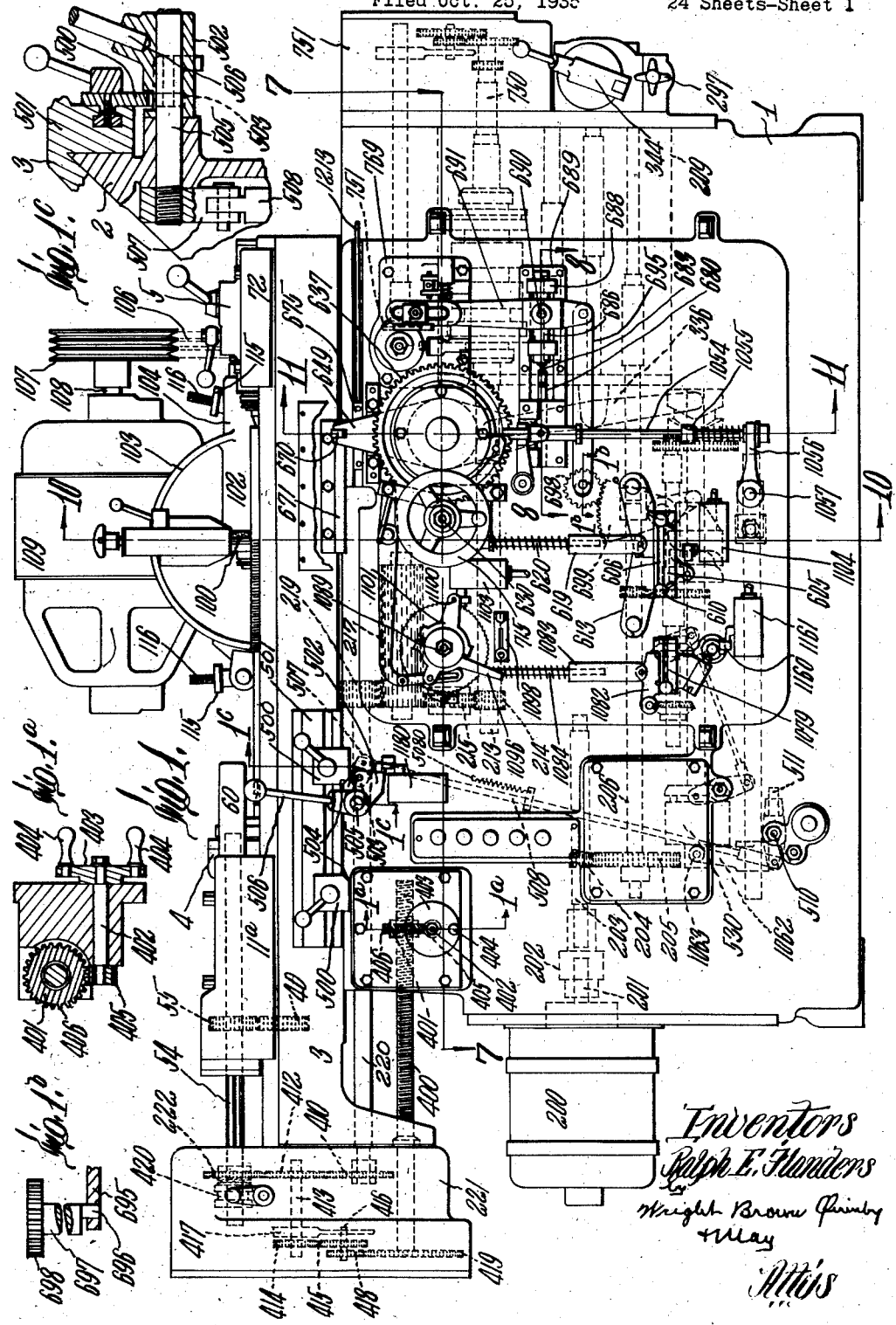

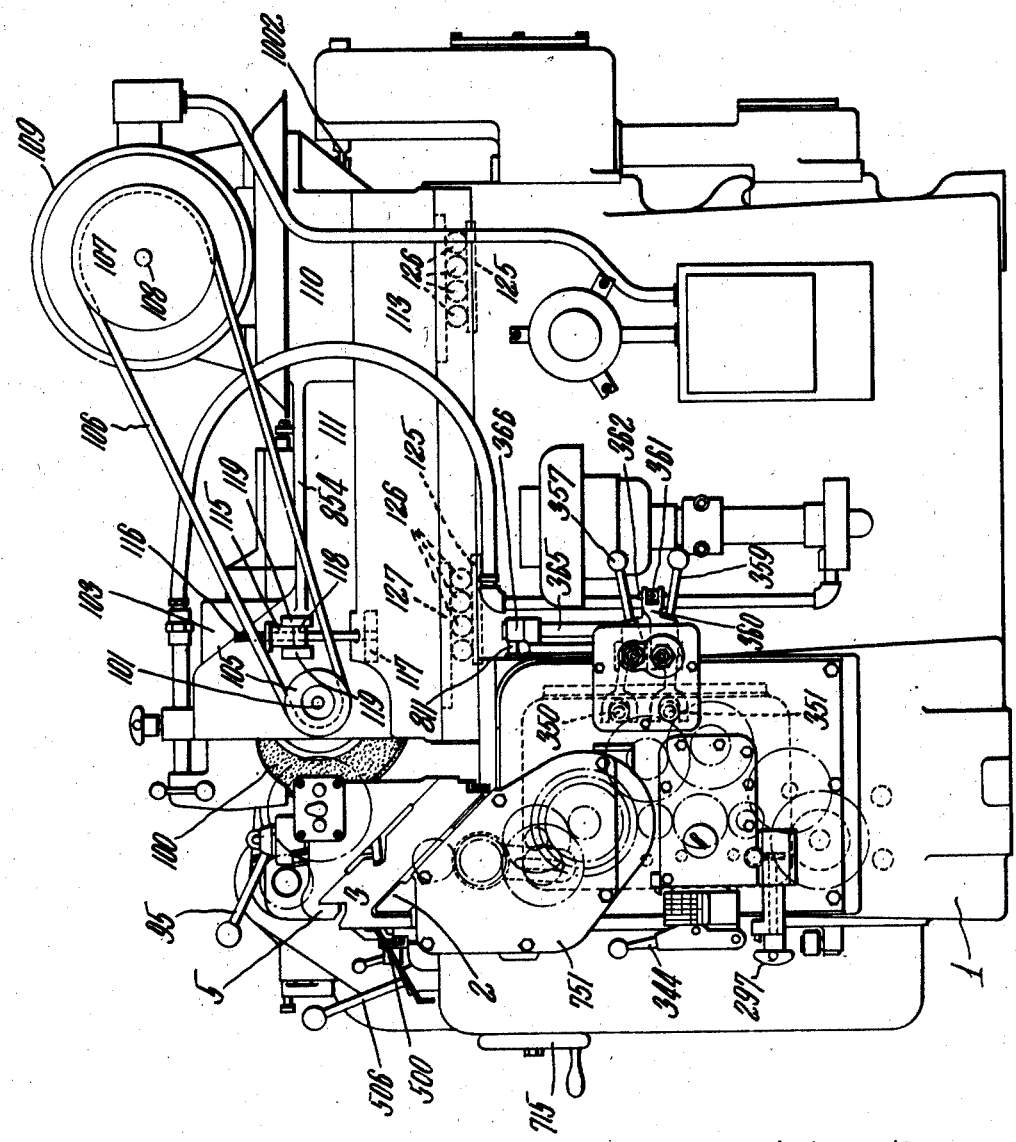

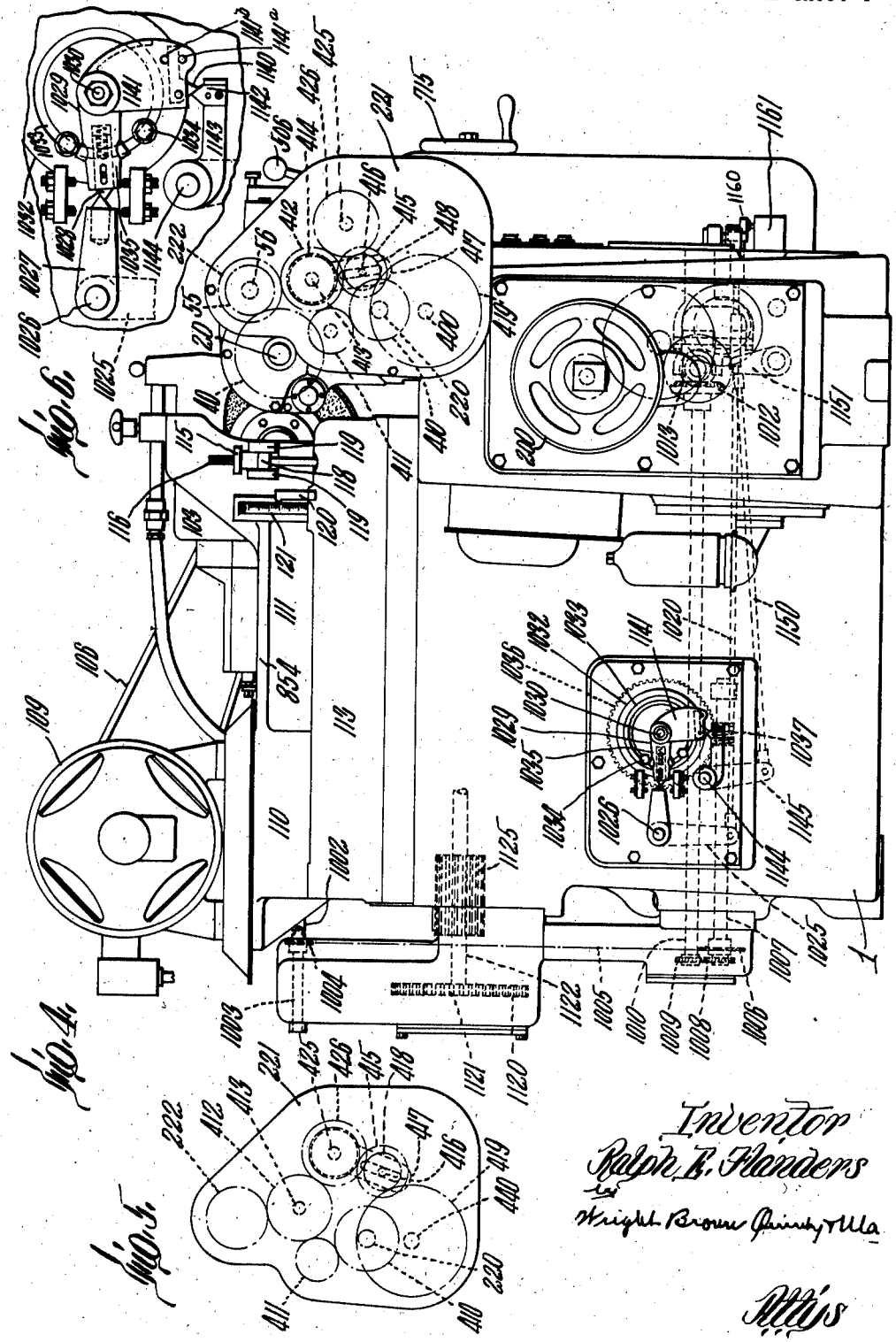

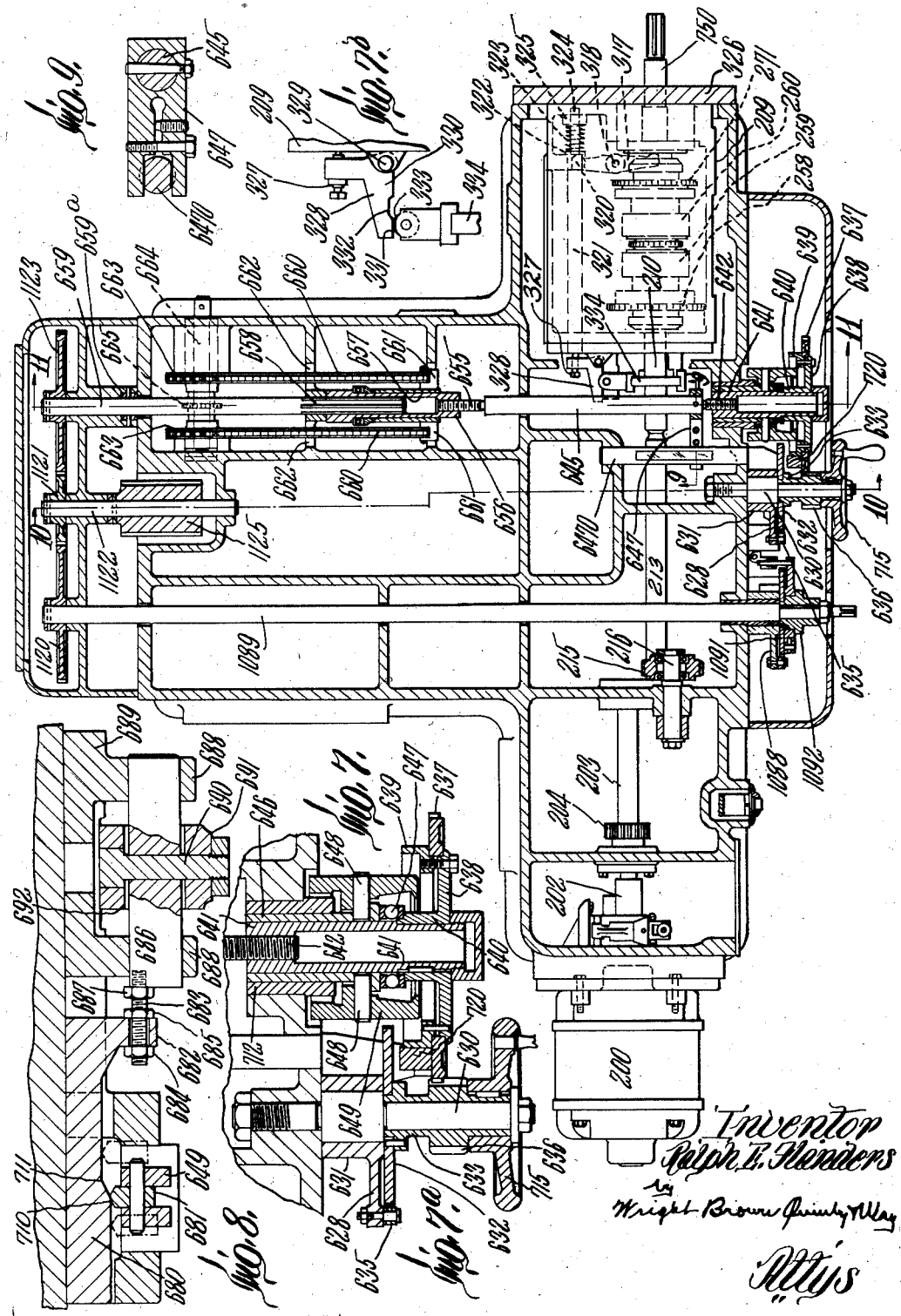

Jan. 16, 1940.   R. E. FLANDERS   2,187,227
GRINDING MACHINE
Filed Oct. 25, 1935   24 Sheets—Sheet 6
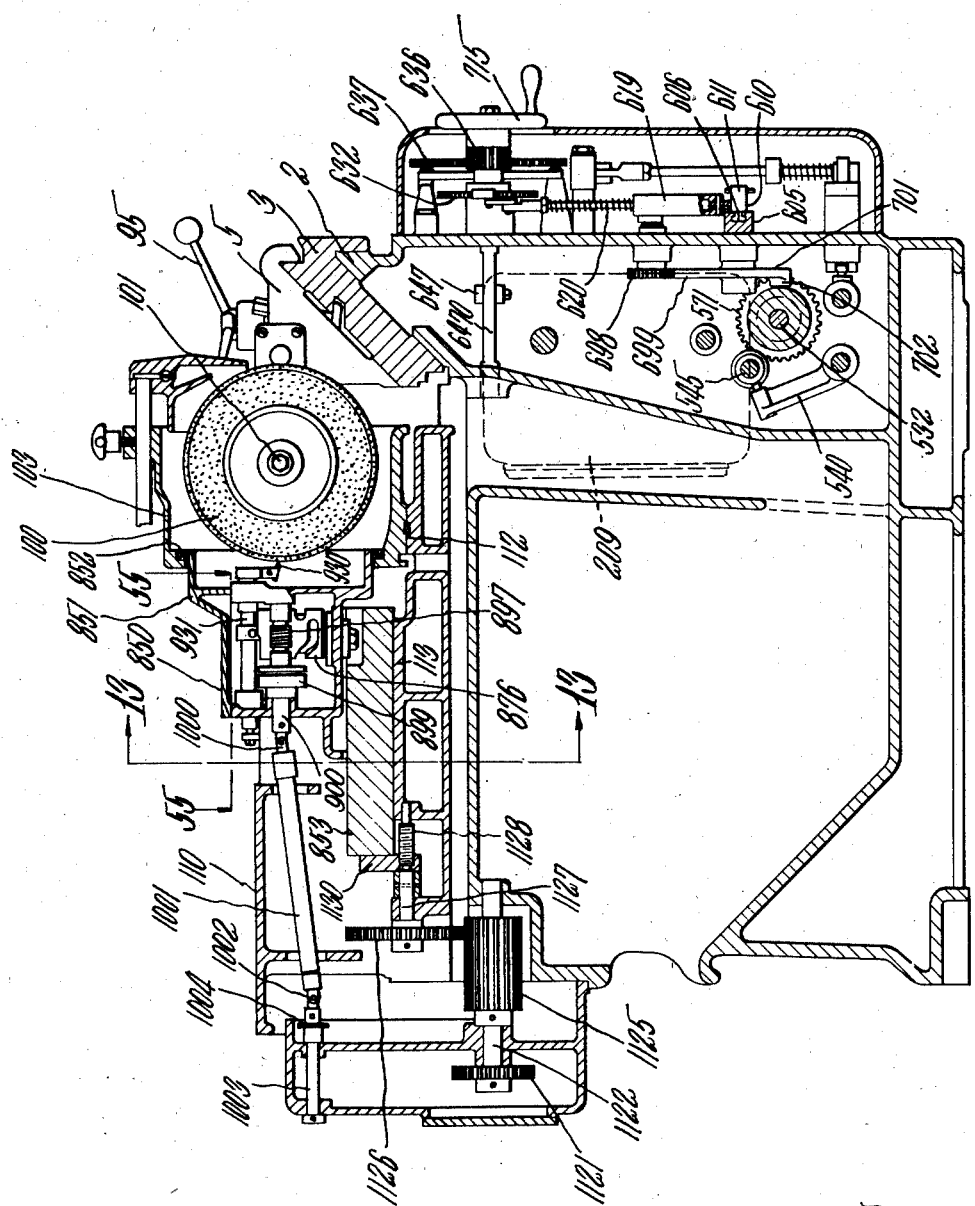
Inventor
Ralph E. Flanders
by
Wright Brown Quinby & May
Attys

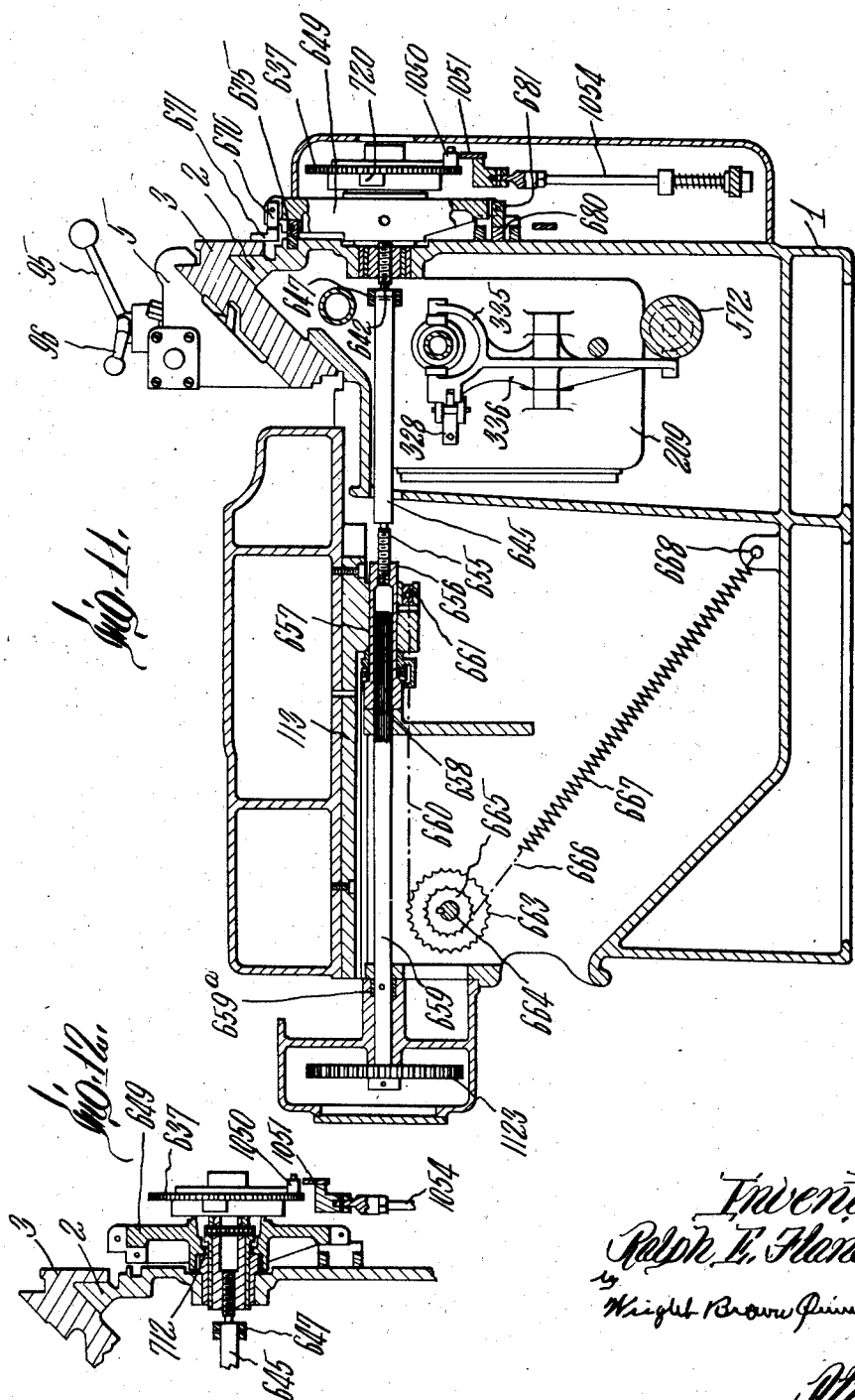

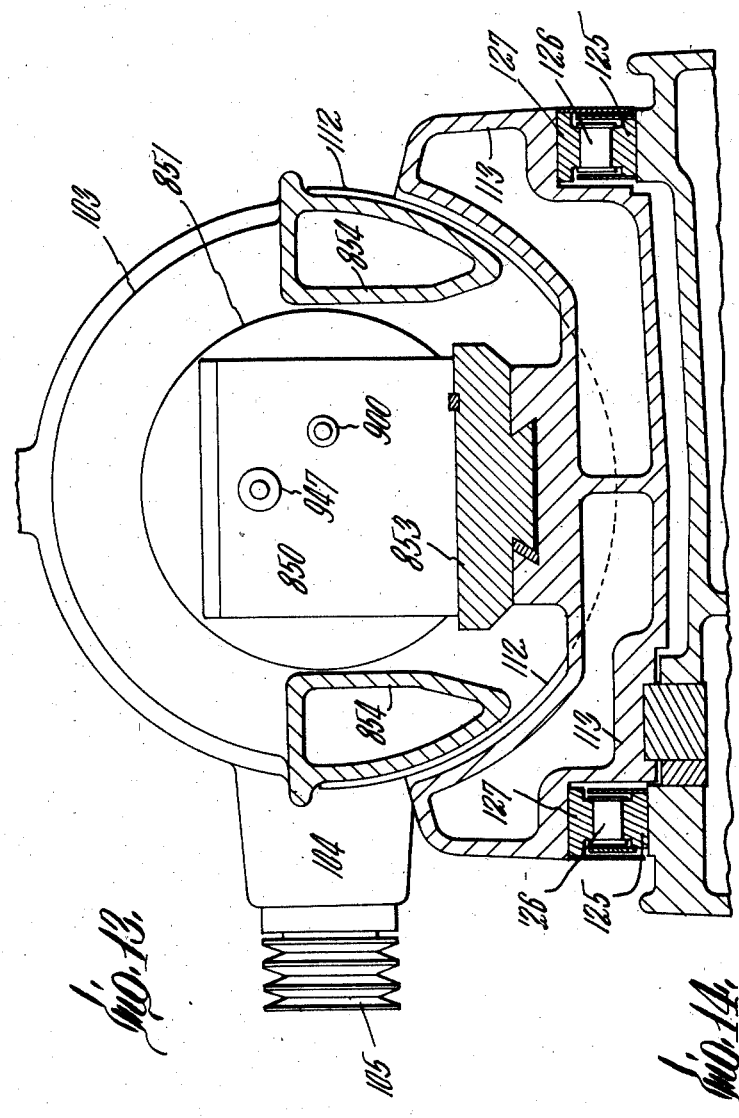

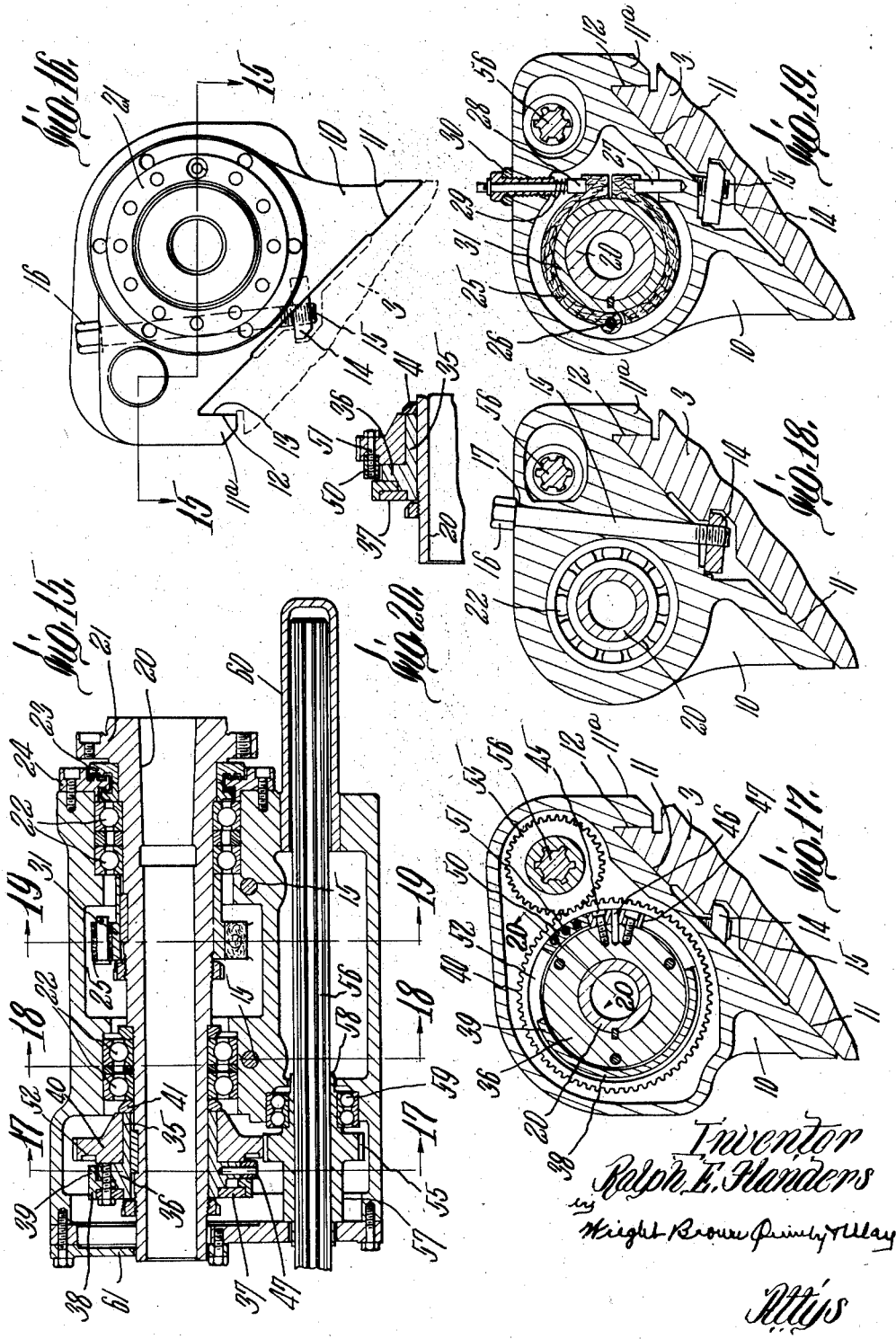

Jan. 16, 1940.   R. E. FLANDERS   2,187,227
GRINDING MACHINE
Filed Oct. 25, 1935   24 Sheets-Sheet 10
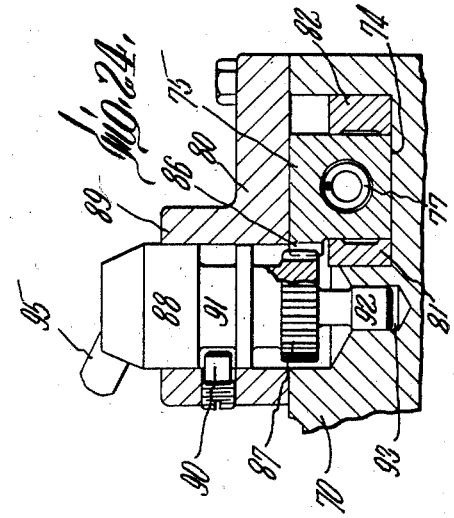
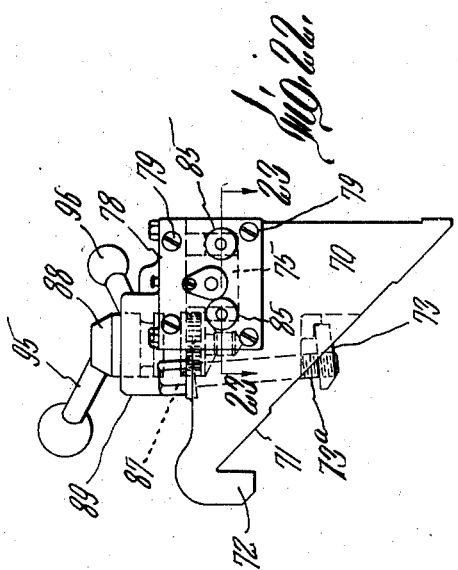
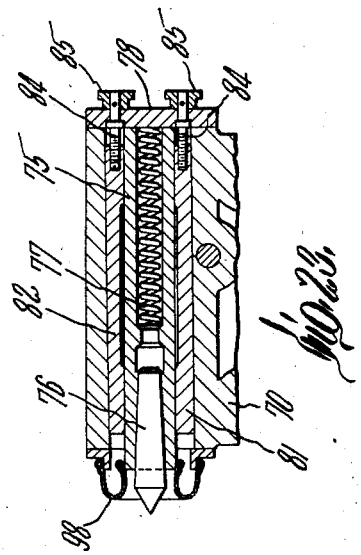
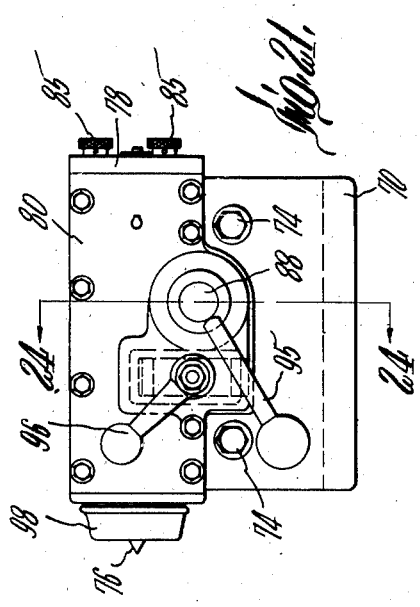
Inventor
Ralph E. Flanders
by
Wright, Brown, Quinby & May
Attys Jan. 16, 1940.  R. E. FLANDERS  2,187,227
GRINDING MACHINE
Filed Oct. 25, 1935  24 Sheets-Sheet 11
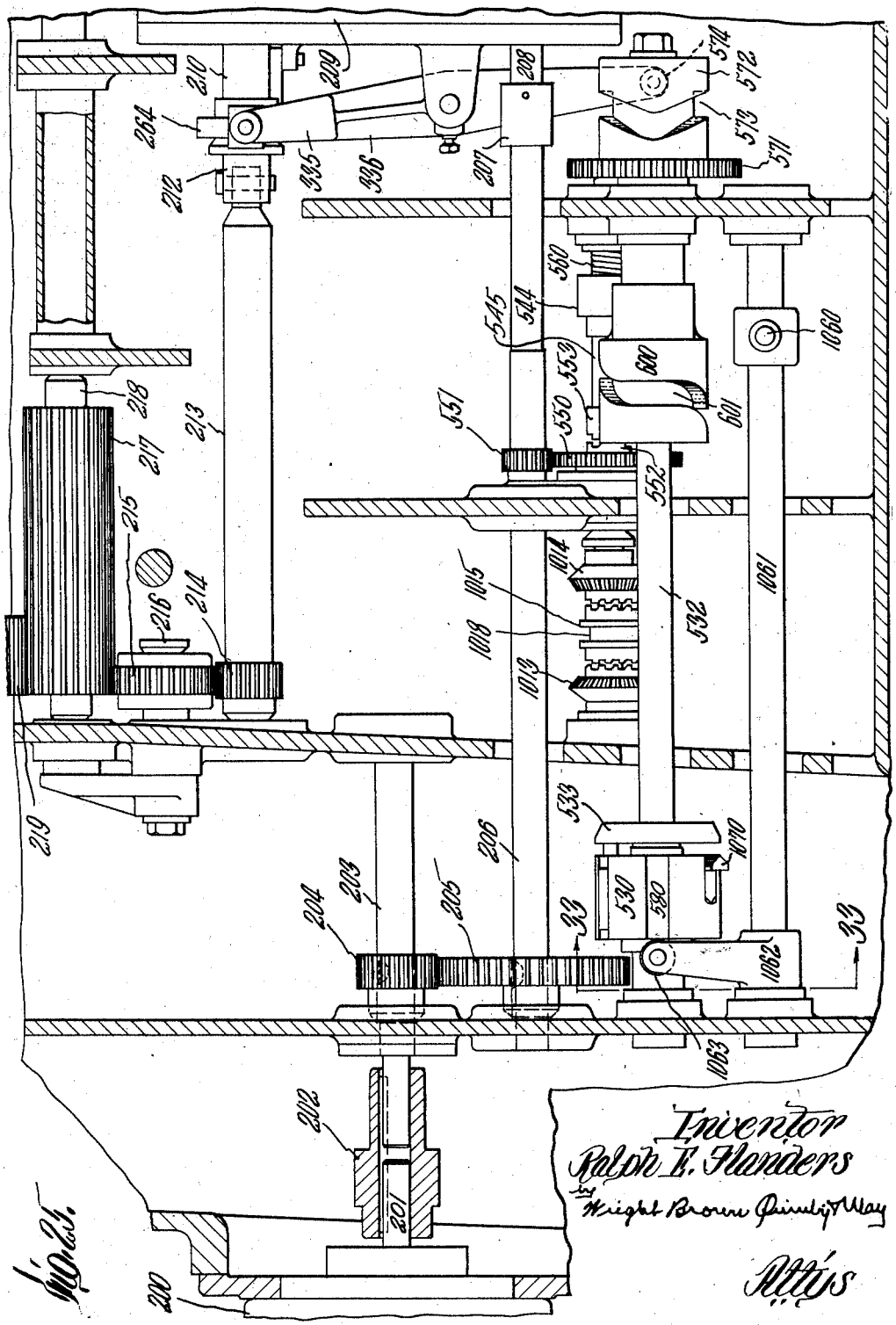

Jan. 16, 1940.　　　R. E. FLANDERS　　　2,187,227
GRINDING MACHINE
Filed Oct. 25, 1935　　24 Sheets-Sheet 12
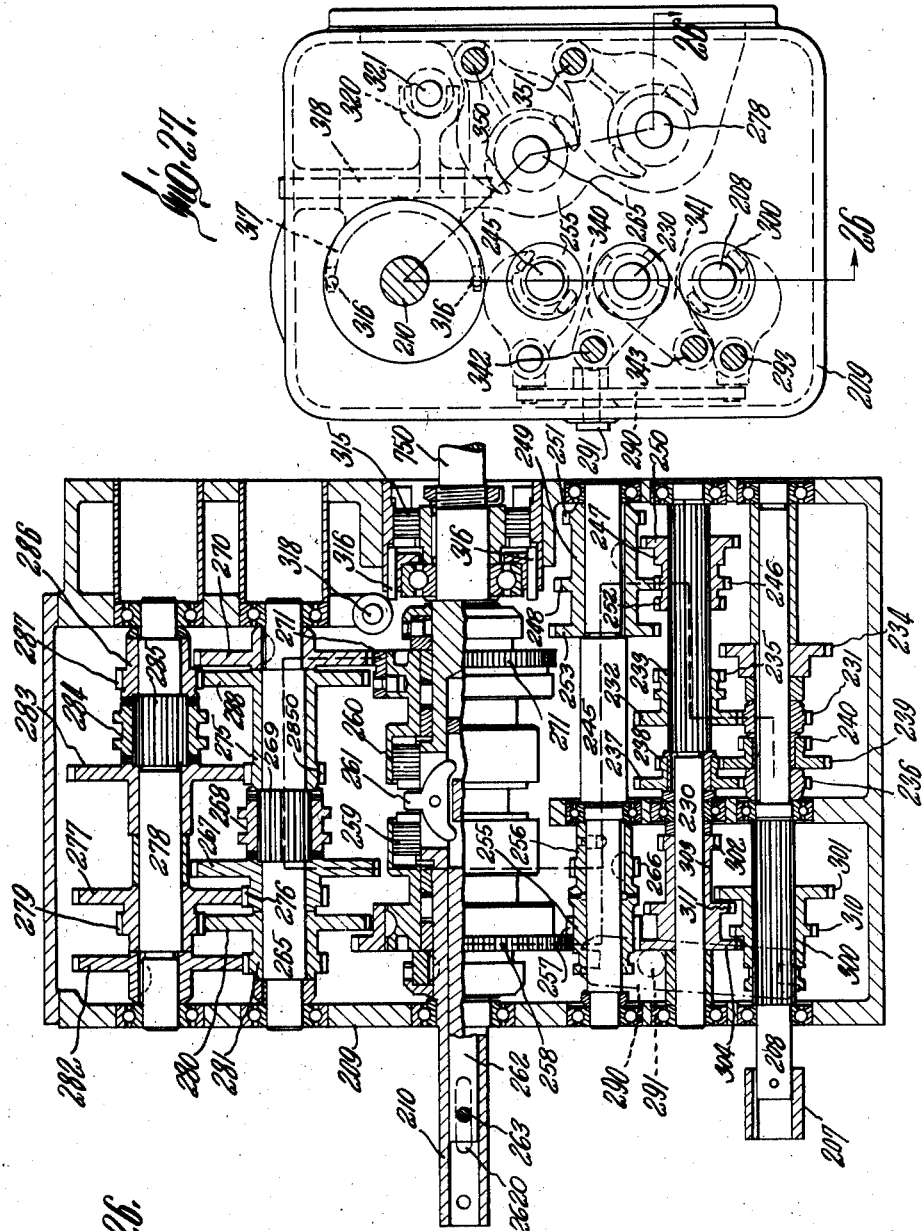

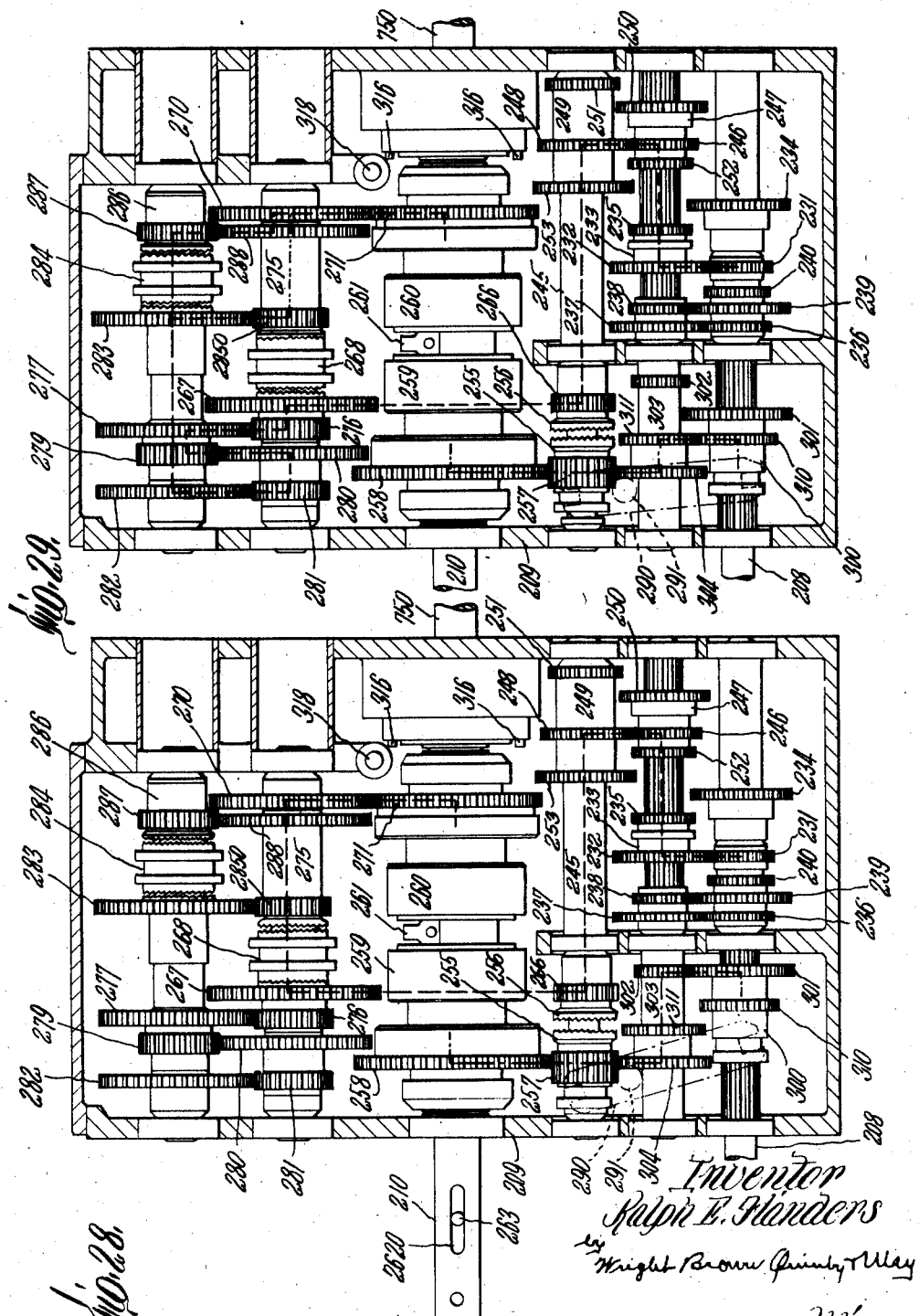

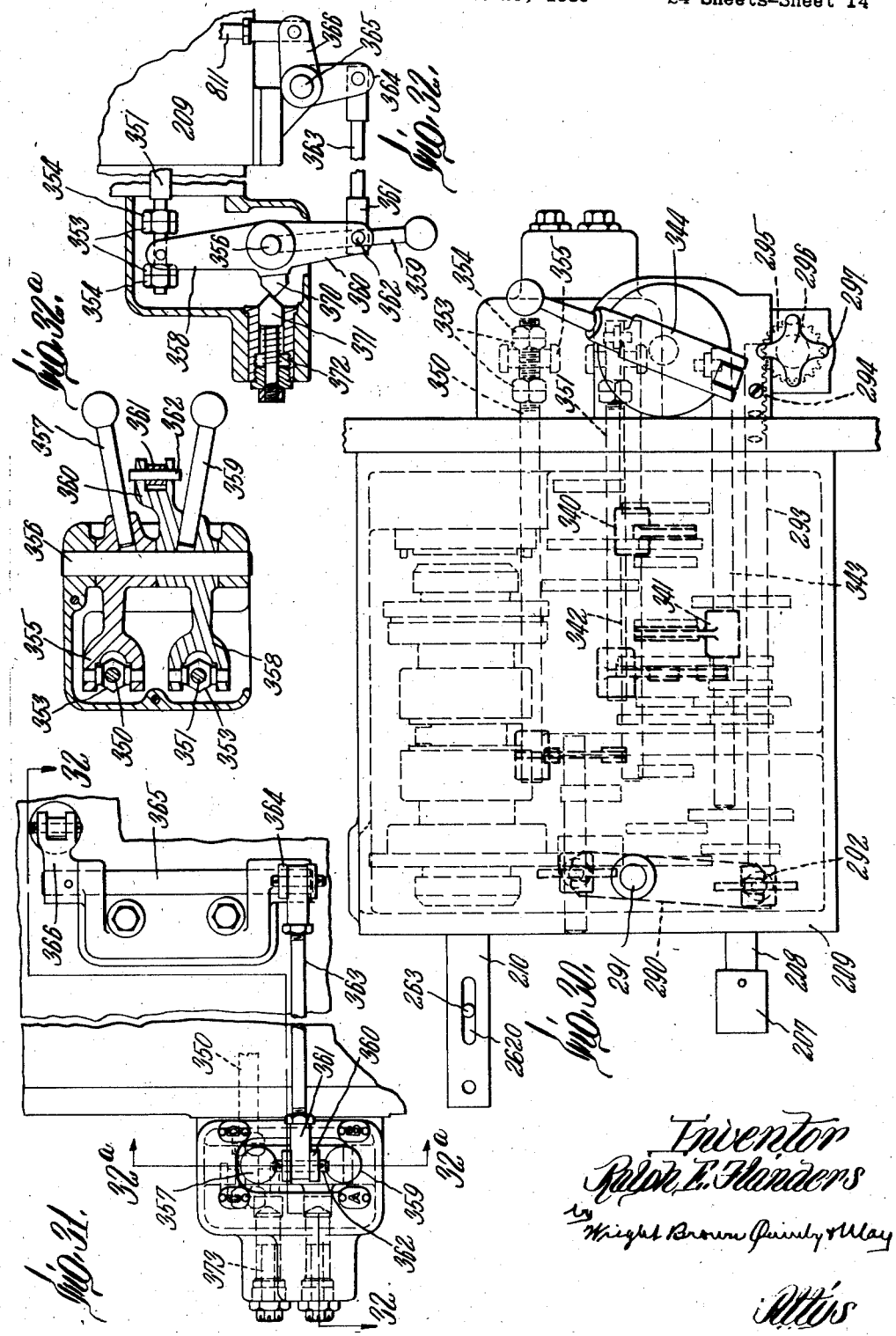

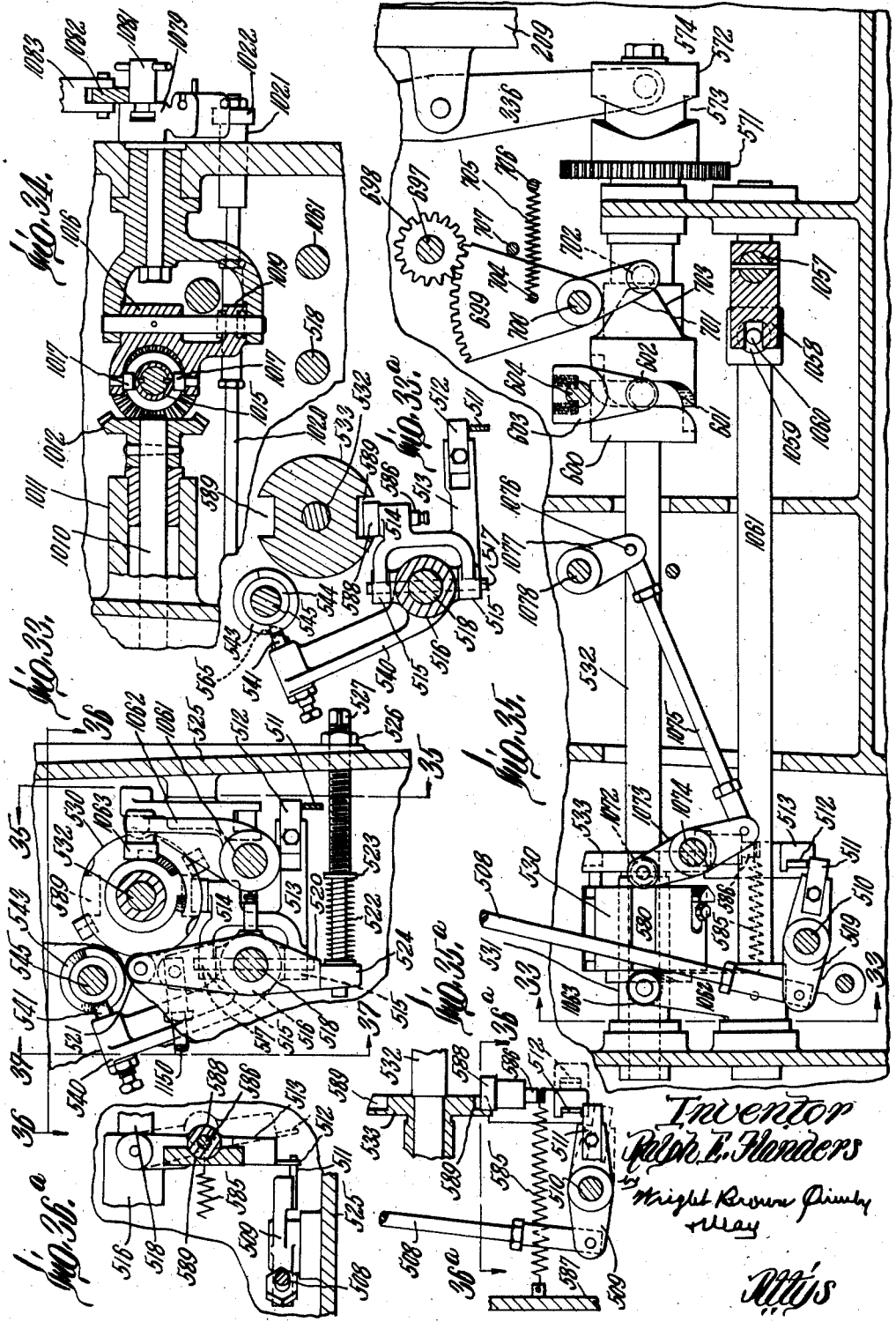

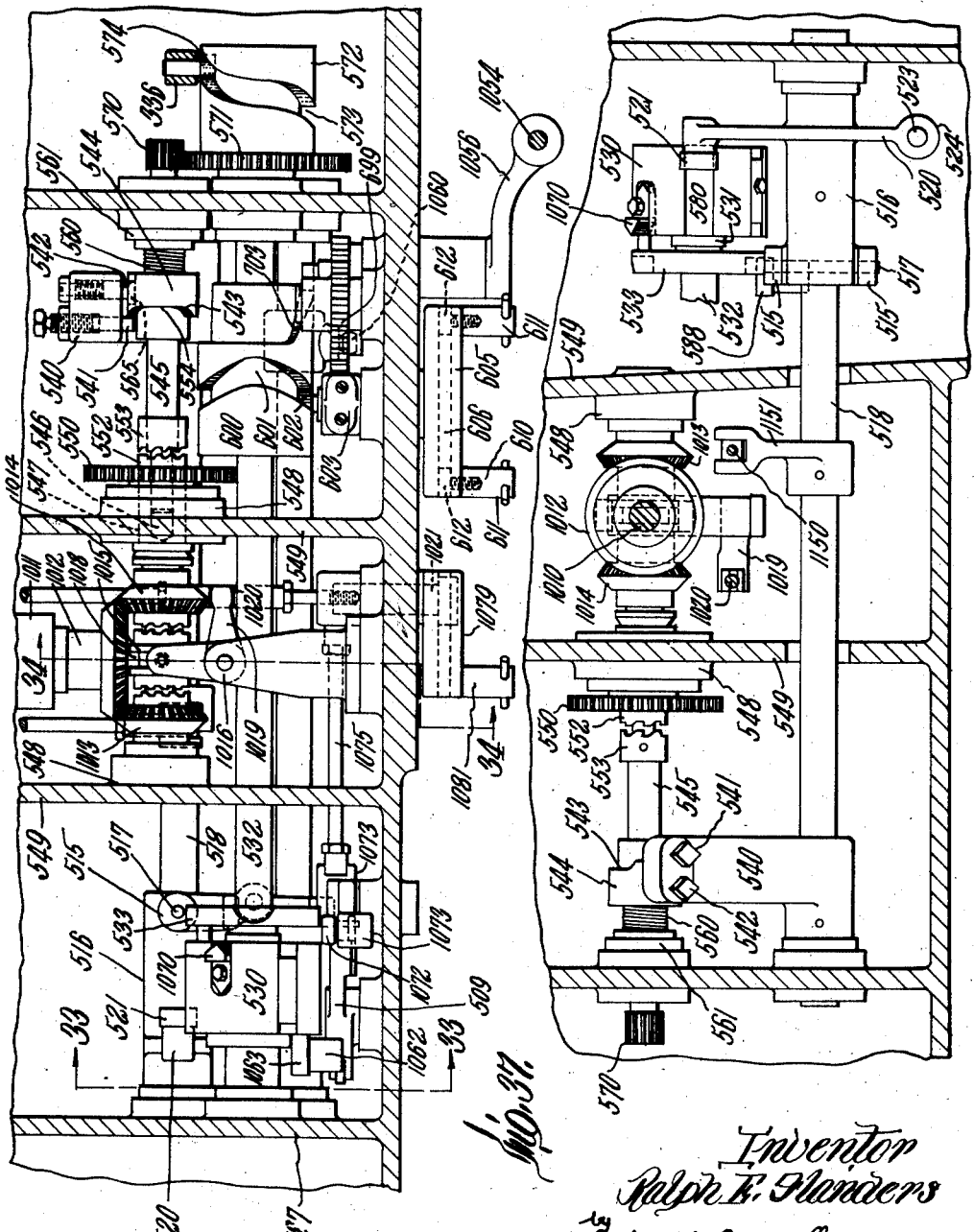

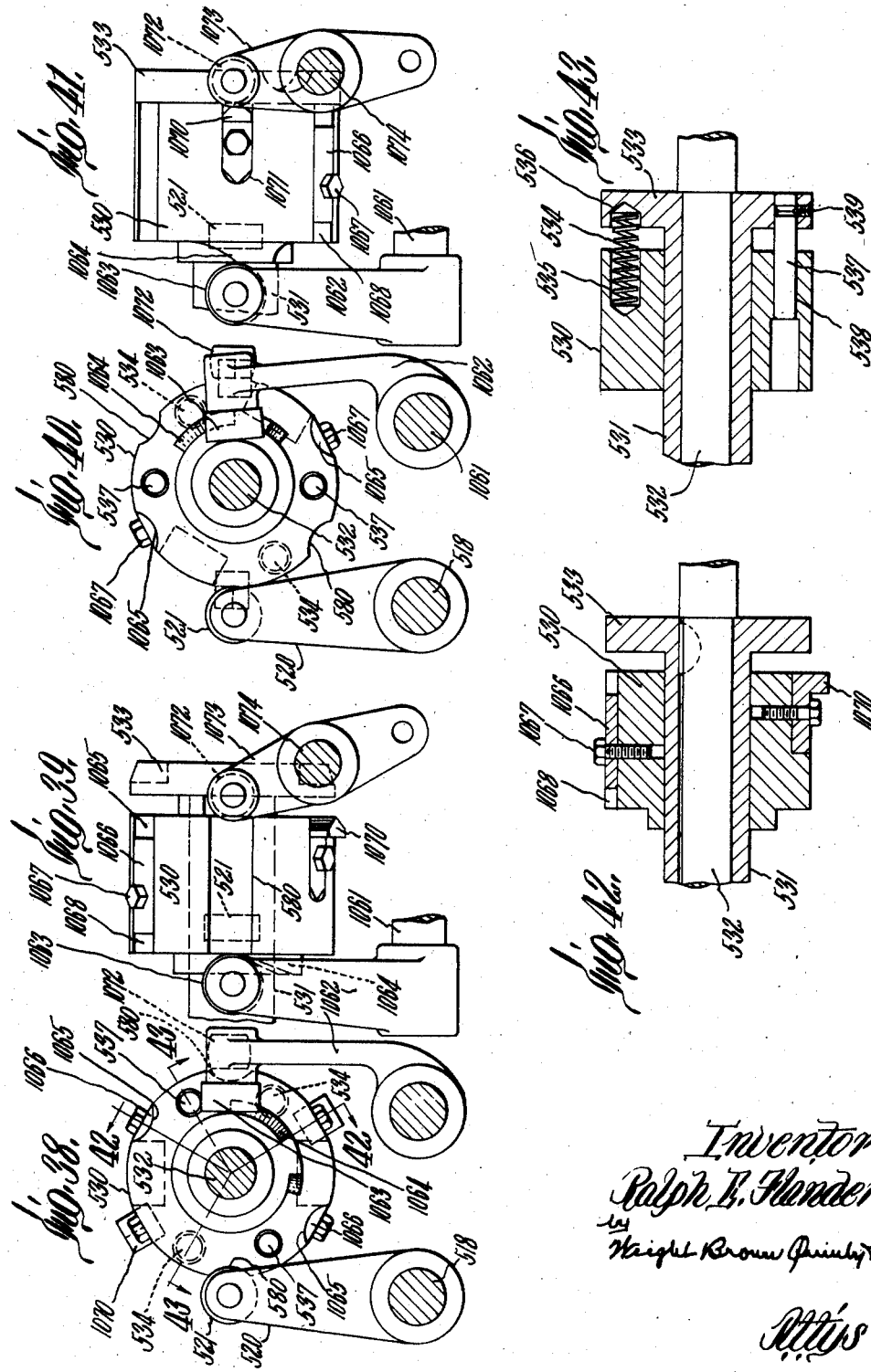

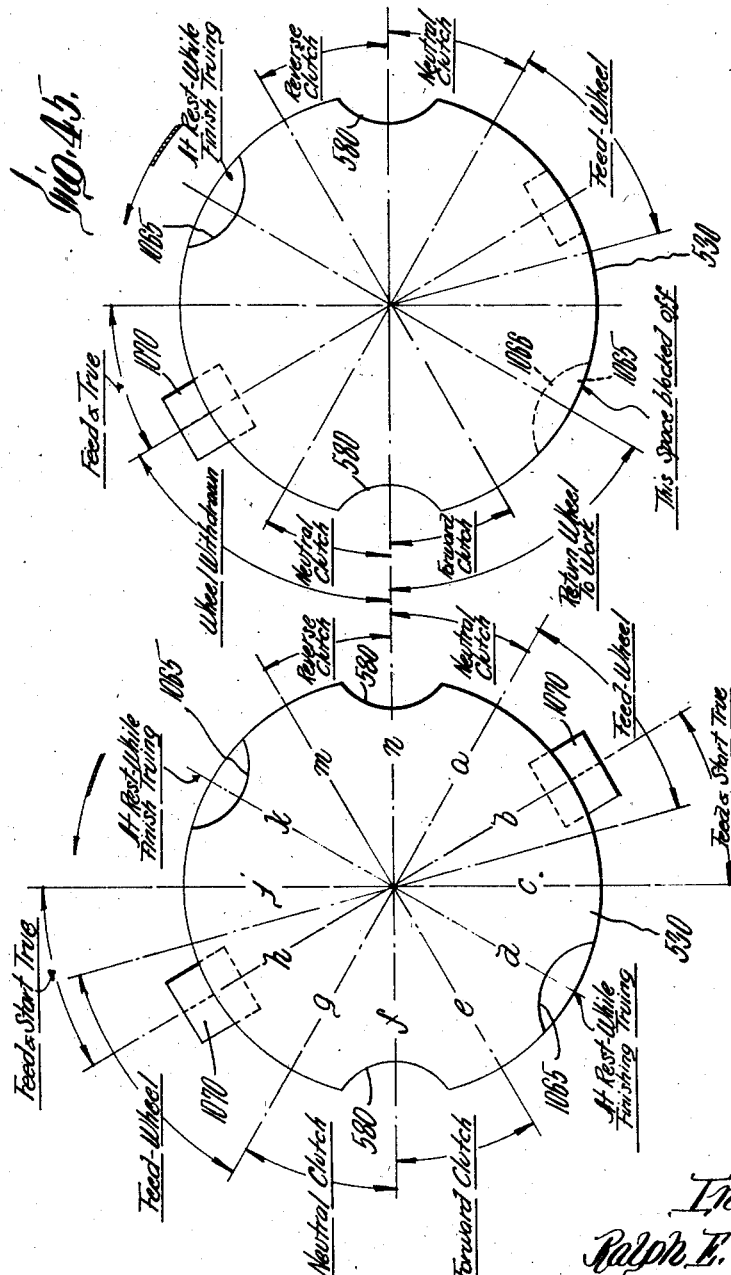

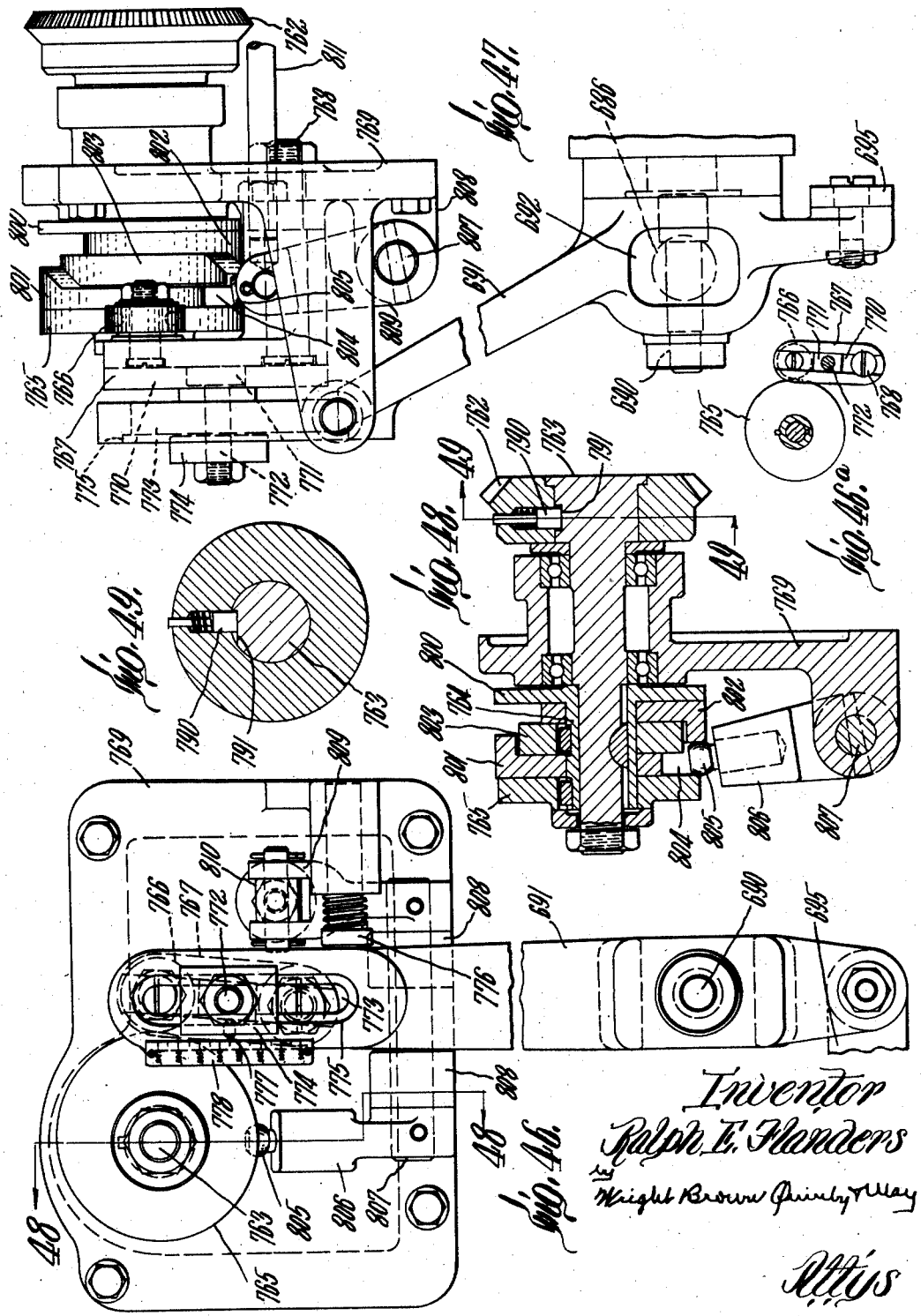

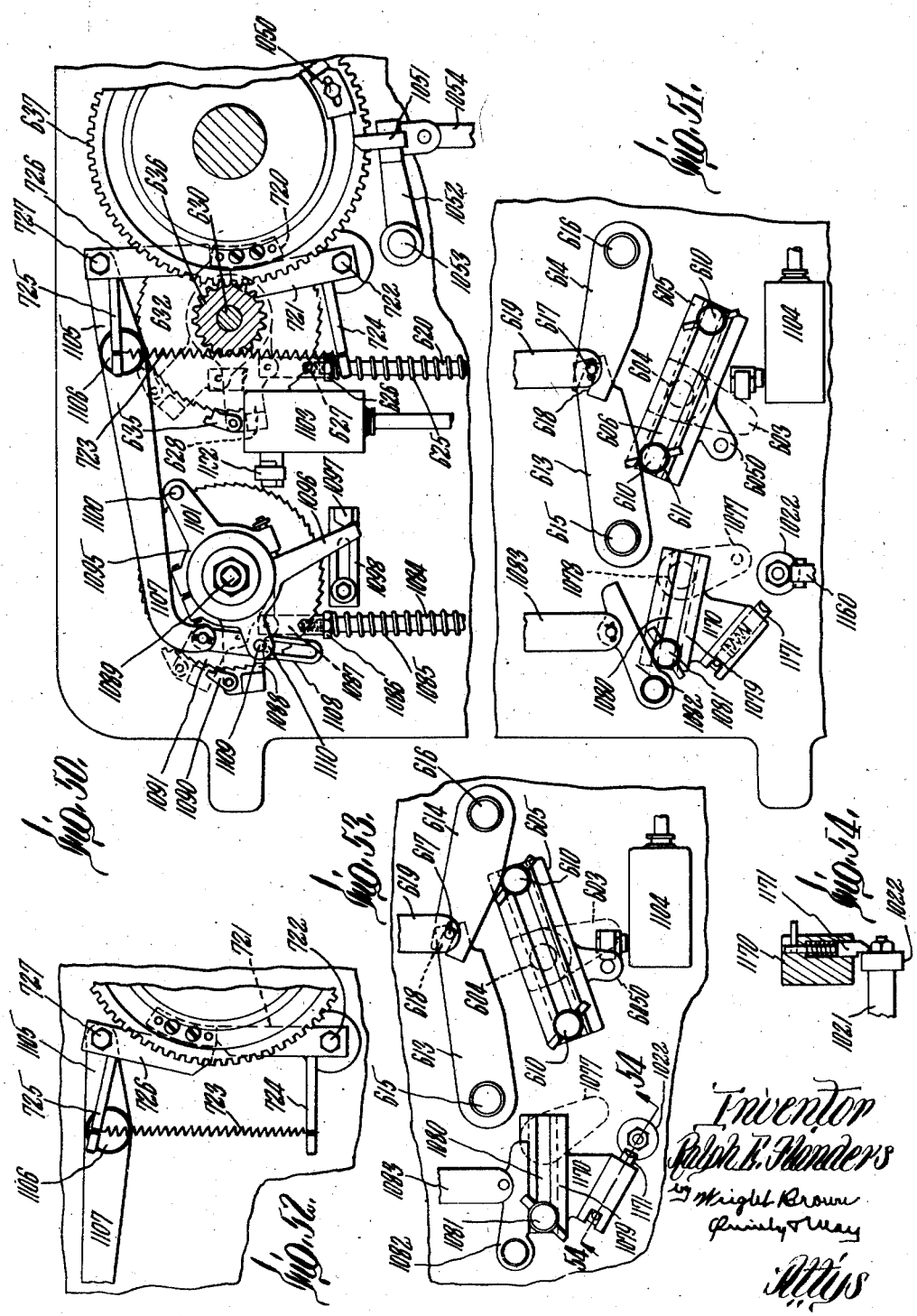

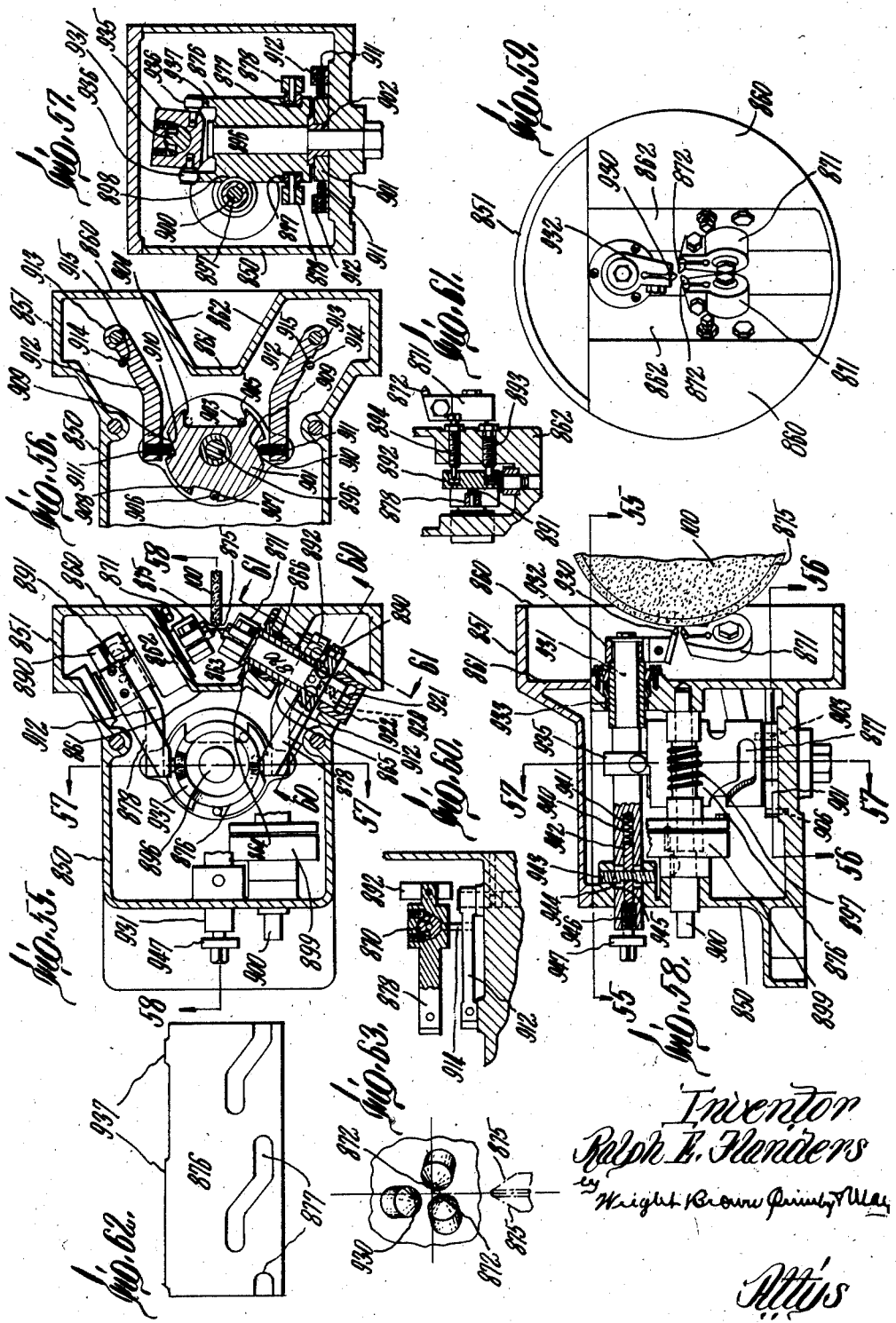

Jan. 16, 1940.  R. E. FLANDERS  2,187,227
GRINDING MACHINE
Filed Oct. 25, 1935  24 Sheets-Sheet 22
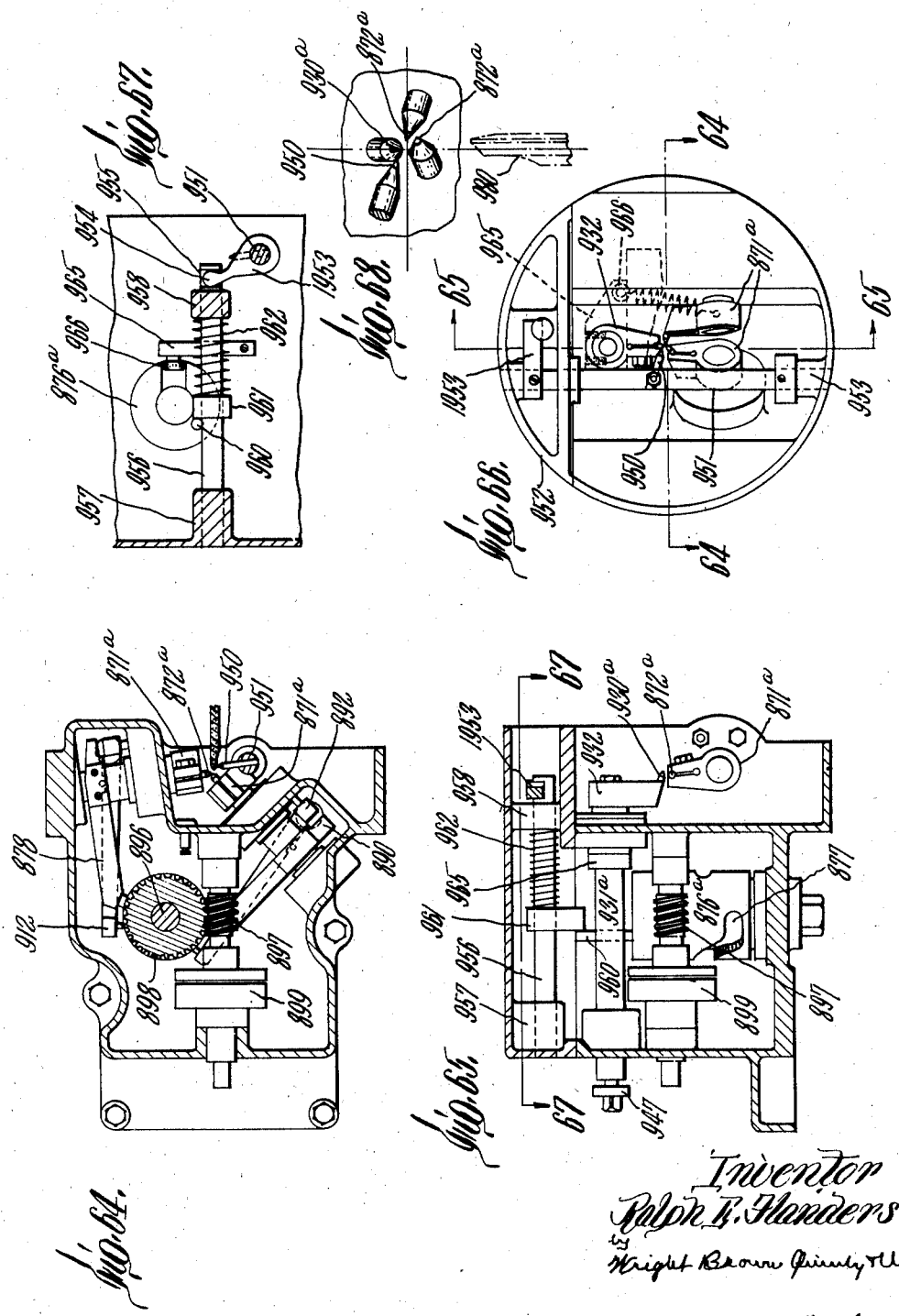
Inventor
Ralph E. Flanders Jan. 16, 1940.  R. E. FLANDERS  2,187,227
GRINDING MACHINE
Filed Oct. 25, 1935  24 Sheets-Sheet 23
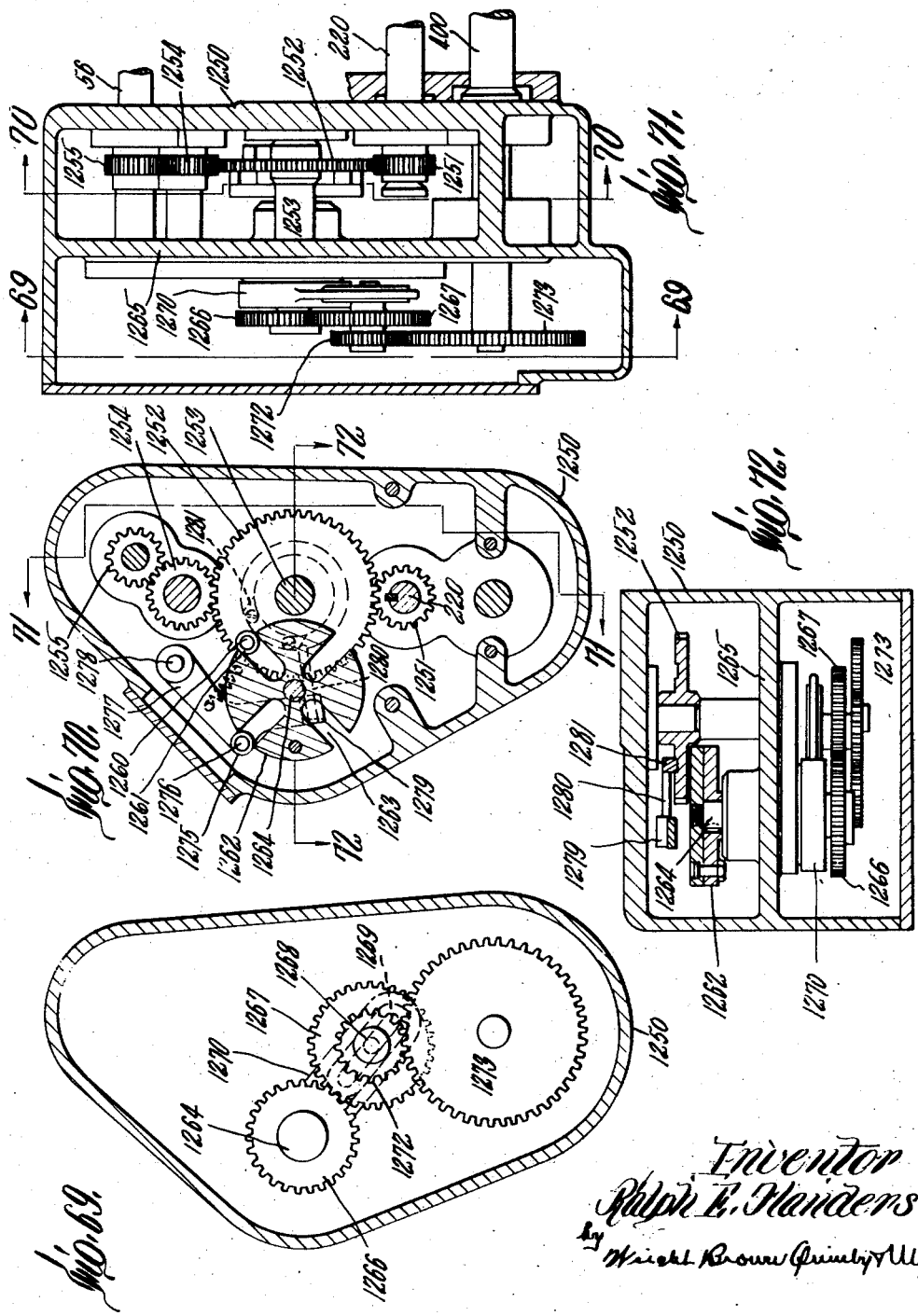

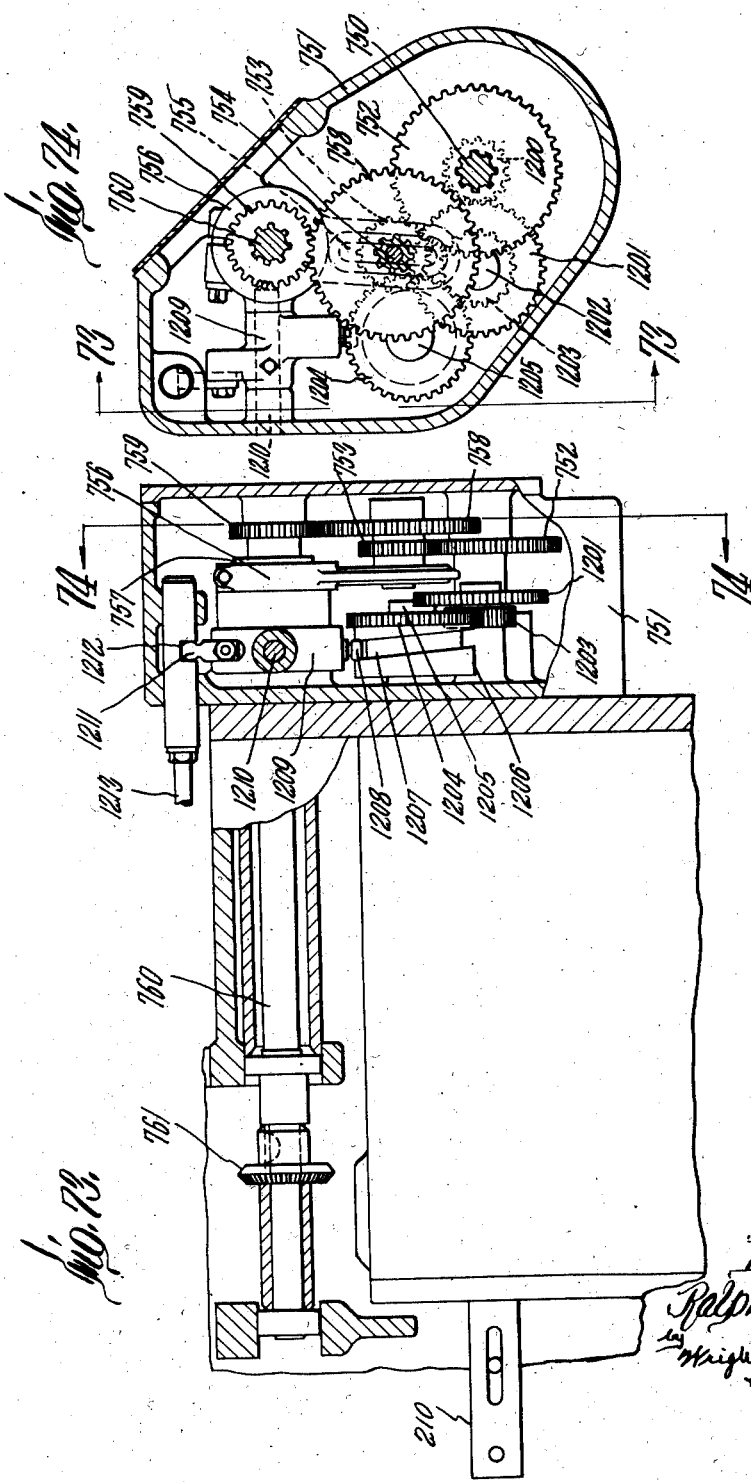

Patented Jan. 16, 1940

2,187,227

UNITED STATES PATENT OFFICE 2,187,227

GRINDING MACHINE

Ralph E. Flanders, Springfield, Vt., assignor to Jones & Lamson Machine Company, Springfield, Vt., a corporation of Vermont Application October 25, 1935, Serial No. 46,756

35 Claims. (Cl. 51—95)

This invention relates to machines particularly suitable for grinding threads, such, for example, as screws or taps, or for grinding articles having circular instead of helical grooves and ridges, such as certain types of hobs. Means are provided in accordance with this invention for grinding selectively during one direction of traverse between the grinding wheel and the work, the return traverse direction being idle, or, if desired, for grinding during both directions of traverse. Grinding may proceed also either at relatively high spindle speed with light cut, or at a lower spindle speed with a heavier cut, as may be desired.

The machine further provides for independent feeds for both ends of the stroke, which feeds are independently adjustable.

The invention has for a further object to provide mechanism by which when a fluted tap whether provided with straight or helical flutes is being ground, the tap may be given high turning speed when the flutes are presented opposite to the wheel and which may be termed "flute jumping", and a lower working speed when the lands are presented to the wheel, thus to save time when the wheel is out of operation.

It also has for another object the provision of means by which the tap lands may be relieved to provide clearance between the tap and the work upon which it may operate back of the cutting edges.

A further object of the invention is to provide for either straight or taper grinding or combinations of the two as may be desired.

A further object is to provide mechanism whereby when a hob or the like having circular rather than helical elements is being ground, there is provided an in and out feed and a motion axially of the hob, and between it and the grinding wheel, which will cause the wheel to operate in succession in the peripheral grooves between successive circumferential ridges.

Still further it is an object of this invention to provide means for automatically truing the wheel at a predetermined distance before the work reaches a predetermined desired dimension, so that the final shape and size of the work shall be accurate, the truing being so controlled with relation to the feed of the wheel that at the end of the grinding operation, the work shall have been ground to the desired size regardless of the amount to which the wheel has been trued.

A still further object is to provide for a lower wheel speed when truing than when grinding, the changes of speed being automatic.

Another object is to provide for truing traverses in a manner which will maintain a true wheel contour regardless of the helical angle of the wheel and without danger of chipping of the wheel edges. In this connection, also, means are provided for adjusting the angularity of the truing paths across the wheel faces so that extreme accuracy of truing is possible.

A further object is to provide for truing at either one or both ends of the traverse as may be desired, and for the ensurement of completion of the truing at any desired rate during a dwell at the end of the traverse before the reverse direction of traverse is initiated.

Further objects are to provide automatic mechanism for carrying out and controlling the desired cycles of operation of the machine.

Still further objects will appear from a more complete description of certain embodiments of the invention shown in the accompanying drawings in which:

Figures 1 and 2 are front and rear elevations, respectively of the machine.

Figure 1a is a detail section to a larger scale on line 1a—1a of Figure 1.

Figure 1b is a detail section on the line 1b—1b of Figure 1.

Figure 1c is a detail section on line 1c—1c of Figure 1.

Figures 3 and 4 are right and left hand elevations, respectively.

Figure 5 is a diagrammatic view of a gear box shown in Figure 4, but with a gear arrangement for left hand rather than right hand thread grinding.

Figure 6 is a view similar to a portion of Figure 4, but to a larger scale.

Figure 7 is a horizontal section on line 7—7 of Figure 1.

Figures 7a and 7b are plan views similar to portions of Figure 7, but to a larger scale.

Figure 8 is a detail section on line 8—8 of Figure 1.

Figure 9 is a detail section to a larger scale on line 9—9 of Figure 7.

Figures 10 and 11 are vertical sections on lines 10—10 and 11—11, respectively, of Figures 1, 2 and 7.

Figure 12 is a detail section similar to a portion of Figure 11, but omitting the former cams used when taper grinding, tap relieving, or backing off are desired.

Figure 13 is a vertical section on line 13—13 of Figure 10.

Figure 14 is a developed view of the speed control plate.

Figure 15 is a horizontal section on line 15—15 of Figure 16 showing the headstock or work spindle.

Figure 16 is an end elevation of the parts shown in Figure 15.

Figures 17 to 19, inclusive, are sections on the correspondingly numbered section lines of Figure 15.

Figure 20 is a detail section on line 20—20 of Figure 17.

Figure 21 is a top plan of the tailstock.

Figure 22 is a right hand elevation of the same.

Figure 23 is a horizontal section on line 23—23 of Figure 22.

Figure 24 is a horizontal section to a larger scale on line 24—24 of Figure 21.

Figure 25 is a detail section with certain parts omitted, but showing the spindle drive from the driving motor to and from the speed control mechanism and to the spindle drive shaft gear.

Figure 26 is a developed section through the speed control mechanism on line 26—26 of Figure 27, showing the parts set for two-way grinding.

Figure 27 is an end elevation of the speed control mechanism box showing certain parts in dotted lines.

Figures 28 and 29 are developed cross sections somewhat similar to Figure 26, but showing the parts set for one-way grinding, Figure 29 showing the arrangement for jumping the flutes of taps.

Figure 30 is a front elevation of the casing shown in Figure 27 and with the speed control handles shown.

Figure 31 is a fragmentary elevation to a larger scale of clutch controlling mechanism shown also in Figure 2.

Figure 32 is a detail on line 32—32 of Figure 31.

Figure 32a is a detail section on line 32a—32a of Figure 31.

Figure 33 is a detail section on line 33—33 of Figures 25, 35 and 36 showing the lay shaft control.

Figure 33a is a view similar to a portion of Figure 33, but with parts removed and parts in section.

Figure 34 is a detail section on line 34—34 of Figure 36.

Figures 35, 36 and 37 are detail sections on the correspondingly numbered section lines of Figure 33.

Figure 35a is a view similar to a portion of Figure 35, but with parts removed.

Figure 36a is a view similar to a portion of Figure 36, but with parts removed and certain parts in section.

Figures 38 to 41, inclusive, are detail views of the lay shaft control cam in different conditions.

Figures 42 and 43 are detail sections on lines 42—42 and 43—43, respectively, of Figure 38.

Figures 44 and 45 are diagrams of the lay shaft controlling cam for two and one-way grinding, respectively.

Figure 46 is a detail elevation to a larger scale than shown on Figure 1 of the wheel feed control.

Figure 46a is a view similar to Figure 46, but with parts removed to a smaller scale.

Figure 47 is a side elevation of the same.

Figure 48 is a detail section on line 48—48 of Figure 46.

Figure 49 is a detail section on line 49—49 of Figure 48.

Figures 50 and 51 together are a fragmentary front elevation to a larger scale than Figure 1 showing part of the truing feed and wheel feed mechanism.

Figure 52 is a fragmentary elevation showing the wheel feed stop in a different position from that shown in Figure 50.

Figure 53 is similar to Figure 51, but with the parts in different positions.

Figure 54 is a detail section on line 54—54 of Figure 53.

Figure 55 is a horizontal section on line 55—55 of Figures 10 and 58.

Figure 56 is a horizontal section on line 56—56 of Figure 58.

Figure 57 is a vertical section on line 57—57 of Figure 58.

Figure 58 is a section to a larger scale similar to a portion of Figure 10 and on line 58—58 of Figure 55.

Figure 59 is a front elevation of the parts shown in Figure 55.

Figures 60 and 61 are detail sections on lines 60—60 and 61—61, respectively, of Figure 55.

Figure 62 is a development of the diamond control cam.

Figure 63 is a diagrammatic showing of the normal idle positions of the three diamonds with relation to the wheel edge for truing to United States standard thread contour.

Figures 64, 65 and 66 are views somewhat similar to Figures 55, 58 and 59, respectively, but arranged for truing the wheel for grinding buttress threads.

Figure 67 is a detail section on line 67—67 of Figure 65 showing the control for the top diamond.

Figure 68 is a view similar to Figure 63, but showing four diamonds arranged for truing the wheel for buttress threads and where the wheel operates close to a shoulder on the work.

Figures 69 and 70 are detail sections on lines 69—69 and 70—70, respectively, of Figure 71 showing a gear box arranged for hob grinding.

Figures 71 and 72 are sections on lines 71—71 and 72—72, respectively, of Figure 70.

Figure 73 is a detail section on line 73—73 of Figure 74 showing a gear box with parts arranged for flute jumping and hob grinding and, when desired, for helical work.

Figure 74 is a section on line 74—74 of Figure 73.

The machine base 1 on its forward upper edge portion is provided with ways 2 on which is slidably mounted a traversing carriage 3 to which are adjustably secured a headstock 4 and a tailstock 5.

*Headstock construction*

The headstock is shown in detail in Figures 15 to 19. It comprises a spindle bearing block or casing 10 having an inclined face 11, which bears against a corresponding face on the carriage 3 and at its upper and forward edge this bearing block is provided with a downwardly extending lip 11a having a face 12 which may be clamped against a mating face 13 of the carriage 3. This may be done by means of a pair of clamping shoes 14 into each of which is threaded the lower end of a clamping bolt 15 which extends up through the block 10 where it is provided with a head 16 bearing on a faced portion 17 of the bearing block.

At 20 is shown the headstock spindle having at its forward end a nose portion 21 to which may be secured by any suitable means some type of work holder such as a chuck or face plate, this nose as shown being one form of the standard spindle nose shown in the Drissner et al. Patent No. 1,961,605, granted June 5, 1934. The spindle 20 is shown as mounted in the ball bearings as at 22, and at its forward end it is provided with a suitable guard 23 cooperating with a stationary member 24 on the bearing block to prevent the entry of abradant, metal particles, or coolant into the bearing portions.

At 25 (see Figures 15 and 19) is shown a two-part friction brake ring, the parts being hinged together as at 26, at one end, and pressed together by spring pressure at the other between the fixed abutment pin 27 and the spring pressed pin 28, the pin 28 being urged toward the pin 27, as by means of the spring 29 reacting between the inner end of a plug 30 threaded into a suitable opening in the spindle bearing block and the enlarged end portion of the pin. This brake is shown as bearing against a removable brake shoe sleeve 31 which may be keyed to the spindle 20. This brake is constantly applied and acts to prevent overrunning of the spindle when its drive is suddenly reversed or reduced to a lower speed and to prevent rotation of the work by friction from the rotation of the wheel.

This spindle is rotated through a suitable backlash take-up illustrated in Figures 15, 17 and 20. This take-up comprises a sleeve 35 keyed to the spindle 20 and provided with a flange 36. To the left hand face of this flange is secured, as by a clamping ring 37, an annular member 38 having a segmental flange 39 extending around a portion of the periphery of the flange 36, and facing one side of a gear 40 journaled on the sleeve 35, and held in place thereon by the spacer ring 41 engaged on its opposite side by one of the ball bearings 22. Secured to the periphery of the flange 36, as by screws 45, and a pin 46, is a segment abutment block 47 which is in the same transverse plane with the segmental flange 39. Between one end of the segmental flange 39 and the abutment block 47 is the driving block 50 which is secured to a face of the gear 40 as by means of the bolts 51, as shown this block 50 lying in an annular channel 52 in the gear face. The gear 40 is driven by a pinion 55, which is slidably but non-rotatably mounted, on a splined shaft 56. The pinion 55 is provided with oppositely extending hub portions 57 and 58, the hub portion 58 being journaled in a ball bearing 59 carried by the bearing block 10, and the splined shaft 56 extends into a tubular casing 60 projecting from the spindle nose end of the bearing block 10 within which it is freely slidable and rotatable. By the driving effort exerted through the pinion 55 on the gear 40, the driving block 50 is driven up against either the segmental flange 39 or the abutment block 47, depending on its direction of rotation. The spacing between the driving block 50 and the adjacent edges of the segment flange 39 and the block 47 is so adjustably fixed that on reversing the direction of drive, all the backlash in the train of gears leading to the spindle and to the traverse lead screw to be later described, is taken up when the driving block 50 is in driving relation to either the flange or block 47. Thus the angular relation of the work with respect to its axial position may be maintained constant which is of particular importance in connection with the jumping of flutes and with relation to the relief of lands between flutes of fluted work. The adjacent end of the block or casing 10 is provided with an opening normally covered by a plate 61 by the removal of which access may be had to the clamping ring 37 and the annular member 38 for purposes of adjustment.

Tailstock construction

The tailstock construction is illustrated in Figures 21 to 24. This comprises a tailstock block 70 having an inclined face 71 for engagement with the correspondingly inclined face of the traversing carriage 3, and it is provided with a down-turned lip 72 at its upper edge for engagement with the corresponding portion on the carriage. This block may be clamped to the carriage in any desired position longitudinally thereof in a similar manner to the headstock bearing block, as by means of a pair of clamping blocks 73 and clamping screws 73a.

The block 70 is provided with a longitudinally extending guide way 74 (see Figure 24) on which is slidably mounted a rectangular slide 75 longitudinally apertured, the forward portion of the aperture being tapered to receive the dead center 76. The rear portion of this aperture is shaped to house a coil spring 77 bearing at its rear end against a cover plate 78, secured in overlapping relation to the end of the guideway 74, as by the screws 79 (see Figure 22). The top of the guideway is closed off by means of the cover plate 80 and on either side of the block 75 are the tapered gibs 81 and 82. These tapered gibs are oppositely tapered and are adjustable lengthwise as by means of the adjusting screws 84 threaded thereinto and mounted for rotation, but prevented from axial movement, in the plate 78, and provided at their outer ends with heads 85 by which they may be turned. Adjustment of these gibs lengthwise serves to adjust the slide 75 laterally, thus aiding in centering the dead center with relation to the work spindle in the headstock.

The slide block 75 may be provided with rack teeth, as at 86, with which cooperate gear teeth 87 on an adjusting rock shaft 88, which is journaled within a tubular extension 89 on the upper face of the cover plate 80 and is held against undue axial motion, as by means of a plug 90 threaded through a side wall of the portion 89, and engaging in a peripheral groove 91 in the rock shaft 88. The lower end of this rock shaft is of reduced diameter and may have a bearing, as at 92, in a bearing socket 93 in the block 70. The upper end of the rock shaft 88 may be provided with a handle 95 by which it may be actuated. A suitable clamp actuated by a handle 96 may be employed in the well known manner to clamp the slide 75 in fixed position axially. A flexible annular dust guard 98, bridging across between the forward end of the slide 75 and the adjacent end of the block 70, may be employed to prevent the entry of foreign matter between the slide 75 and the gibs 81 and 82.

Grinding wheel mounting

For operating on work carried between the head and tailstocks is the grinding wheel 100, the mounting for which is best shown in Figures 1, 2, 3, 10, 11 and 13. This grinding wheel 100 is fixed to the wheel shaft 101, which is suitably journaled in a casing 102 (see Figure 1) which is formed as a portion of a tubular housing or hood 103, the casing 102 being arranged radially with reference to the housing 103, and extending outwardly therebeyond as at 104 (see also Figures 2 and 13). Beyond the part 104 the wheel shaft 101 is provided with a belt pulley 105 over which passes a belt 106, which likewise passes over a belt pulley 107 secured to the shaft 108 of a driving motor 109. This driving motor is supported on a table member 110 which is integral with the tubular housing 103 and is a rearward extension thereof. The housing 103, and this table extension 110, form portions of a cradle member 111 provided with an arcuate bearing portion 112 having its center of curvature substantially concentric with the center of the grinding wheel 100. This cradle member is rockably mounted on this arcuate portion 112 on a saddle or carriage 113, which is slidable transversely toward and from the traversing carriage 3. The angular position of the cradle 111 in the saddle may be determined by adjustment of the nuts 115 threaded upon rods 116, the lower ends of which are pivoted as at 117 to the saddle 113. These nuts bear on blocks 118 pivoted between ears 119 projecting from opposite sides of the cradle 111 on either side of the annular housing portion 103. An indicator 120 fixed to the saddle, and cooperating with a dial plate 121 on the housing portion 103, serves to indicate the angular adjustment of the cradle with reference to the saddle, this adjustment being for the purpose of conforming the angle of the central plane of the grinding wheel to the helix angle of threaded work being operated upon. The saddle 113 is mounted for its motion toward and from the traversing carriage on track members 125 (see Figures 2, 3, and 13) through bearing rollers 126, there being cooperating track ways 127 carried by the lower face of the saddle 113.

Work rotating mechanism

The work, which is supported between the headstock spindle and the tailstock, is rotated by mechanism enclosed within the machine. This mechanism comprises the driving motor 200 (see Figures 1, 2, 6, 7 and 25) mounted on the left end of the machine base 1. The armature shaft 201 of this motor is connected through a coupling 202 with a shaft 203 (Figure 25). This shaft has fixed thereto a pinion 204 which meshes with a gear 205 fixed to a shaft 206. The shaft 206 has a coupling 207 on its end remote from the gear 205, and through this coupling it is connected to a shaft 208 projecting from a change gear box 209 shown best in Figures 26 to 29. After passing through the various gear connections and clutches in this box 209, which will later be described, the drive comes out from the box 209 through the shaft 210, and the coupling 212 to a shaft 213. This shaft 213 has fixed thereto a pinion 214, which meshes with a gear 215 on a stub shaft 216, this gear in turn meshing with a long gear 217 on a shaft 218. With this long gear 217 meshes the gear 219. This gear 219, as shown in Figure 1, is carried by a shaft 220 which is mounted to move with the traversing slide 3, and at one end enters into a gear casing 221 in which connections are made through suitable gearing, which will later be described, and which may be different in accordance with the particular cycle of operations which it is desired to produce, to a gear 222 fixed to the splined shaft 54 through which the rotation of the work spindle is produced as has been previously described.

Spindle speed control mechanism

This mechanism is that contained in the gear box 209, shown in detail in Figures 26 to 30, inclusive. In Figure 26 the parts are shown in condition for two-way grinding where the work is driven first in one direction during traverse of the work carriage in one direction, and then the work is driven in the opposite direction during a working traverse of the carriage in the opposite direction. Referring to this Figure 26, the shaft 208 drives a shaft 230 through a change gear mechanism, including a gear 231 keyed to the shaft 208 and in the position shown, meshing with a gear 232 on a sliding gear sleeve 233. By shifting the sleeve 233 to the right, the drive may be through a gear 234, also keyed to the shaft 208, and a gear 235 carried by the sleeve 233. By shifting the gear sleeve 233 to the left, the drive is through the gear 236 keyed to the shaft 208 through the gear 237 journaled on the shaft 230, back through the gear 238 fixed to the gear 237 on the gear 239 journaled on the shaft 208, and through a gear 240 fixed to the gear 239, back to the gear 232 on the sleeve 233.

From the shaft 230 the drive is to the shaft 245, this, as shown, being through the central gear 246 of a sliding gear sleeve 247 mounted on the splined portion of the shaft 230, through the central gear 248 of a gear sleeve 249 keyed to the shaft 245. By shifting the gear sleeve 247 to the right, its gear 250 may be brought into mesh with a gear 251 on the sleeve 249, or by shifting the sleeve 247 to the left, the gear 252 thereon may be brought into mesh with a gear 253, also on the sleeve 249. Thus the shaft 230 may be driven at any of three selected speeds from the shaft 208, and the shaft 245 may be driven at any of three selected speeds from the shaft 230, so that nine different speeds of the shaft 245 to one speed of the shaft 208 are possible with this gear arrangement.

In the two-way grinding position, as shown in this figure, the clutch collar 255, which is journaled on the shaft 245, is in clutching relation to the collar 256 keyed to this shaft, so that a gear 257 on the clutch collar 255 is being driven, and this meshes with a gear 258 journaled on the shaft 210, but which may be clutched to the shaft through a friction clutch at 259 for one direction of rotation of the shaft 210. This clutch, and also a reverse direction clutch 260, are actuated by a rock member 261 fulcrumed on the shaft 210 and actuated by a bar 262 slidable axially within the shaft 210, this shaft 210 having a slot 2620 therethrough within which rides an actuating pin 263 which is controlled by the clutch shift collar 264, shown best in Figure 25.

For the opposite direction of rotation of the shaft 210, the clutch 259 being released and the clutch 260 being closed, the drive from the shaft 245 is through a jack shaft 265. The keyed clutch collar 256 on the shaft 245 is provided with a pinion portion 266 which meshes with a gear 267 journaled on the shaft 265, but which may be clutched to this shaft 265 by means of a clutch collar 268, which is slidable on a splined portion 269 of the shaft 265 into or out of clutching engagement with the gear 267. When this clutch collar 268 is in clutching relation to the gear 267, the shaft 265 is driven thereby, and through a gear 270 keyed to the shaft 265, a gear 271 journaled on the shaft 210 and carried by a portion of the clutch 260 is driven so that when the clutch 260 is closed, the shaft 210 is driven thereby.

If desired, the shaft 265 may be driven at other speeds from the gear 267. When this is desired the clutch collar 268 is out of clutching relation thereto and is in clutching relation to a sleeve 275. Fixed to the gear 267 is a pinion 276 which meshes with a gear 277 journaled on the shaft 278. Fixed to the gear 277 is a pinion 279 which meshes with a gear 280 journaled on the shaft 265. Fixed to the gear 280 is a pinion 281 in mesh with a gear 282 keyed to the shaft 278, so that the shaft 278 is driven from the gear 267 through this train of reduction gearing. The shaft 278 has a gear 283 journaled thereon, and this may be clutched to be driven by the shaft 278 by the slidable clutch collar 284 mounted on a splined portion 285 of the shaft 278. When the clutch collar 284 is in clutching engagement with the gear 283, this gear 283 is driven by the shaft 278 and this gear 283 meshes with a gear 2850 on the sleeve 275, so that when the clutch collar 268 is in engagement with this sleeve 275, the shaft 265 is rotated and through the gear 270 it rotates the clutch part 260. By throwing the clutch collar 284 to the right, a still different speed may be produced, this clutch collar then being in driving relation to the sleeve 286 journaled on the shaft 278 and having a pinion 287 meshing with a gear 288 on the sleeve 275. The sleeve 275 is thus rotated and when the clutch 268 is in engagement therewith, the shaft 265 is driven thereby and the clutch 260 is rotated. These drives with the clutch collar 268 clutched to the sleeve 275 will ordinarily be used for one-way tap grinding when the flutes are jumped as illustrated in Figure 29.

The clutch collar 255, which is in clutching relation to the fixed collar 256 in the position shown in Figure 26, is held in this position by means of a shift lever 290 shown in dotted lines in Figures 26 to 29 and fulcrumed at 291. Its opposite or lower end, as shown best in Figure 30, is in engagement with a pin 292 carried by an axially movable rod 293, this rod being provided at its outer end with rack teeth as at 294 by which it may be moved axially through the medium of a gear 295 meshing therewith and carried by a shaft 296. This shaft has a star hand wheel 297 on its outer end accessible for actuation by the operator. This lower end of the shift lever 290 also is arranged in shifting relation to a sliding gear sleeve 300 mounted on a splined portion of the shaft 208, and, in the case of one-way grinding, as illustrated in Figures 28 and 29, this sleeve 300 is in either of two selected operative positions. Thus, as shown in Figure 28, a gear 301 on the sleeve 300 is in mesh with the pinion 302 on a sleeve 303 journaled on the shaft 230, and a gear 304 fixed to the sleeve 303 is then in mesh with the gear 257 on the collar 255, which is then out of clutching relation to the collar 256, having been moved out of such relation by the swinging of the shift lever 290. This gear 257 is, however, still in mesh with a gear 258, which drives the left hand clutch part 259, so that when this clutch part is active, the shaft 210 is being driven. When the clutch part 259 is out of driving relation and the clutch part 260 is in such relation, the drive is through the gears 231, 232, any of the selected gears 252, 246 and 247, with their mating gears 253, 248 and 251, respectively, through the shaft 245, the gear 266, the gear 267 and through any of the selected drive arrangements from this gear 267, depending on the position of the clutch collars 268 and 284, described in connection with Figure 26, through the gear 271, to the right hand clutch mechanism 260. This gives the same speed range of drive of the work though the clutch 260 as shown in Figure 26, but for the reverse direction of the work during the idle traverse of the work carriage there are only two speeds available, both relatively high, and determined by the position of the gear sleeve 300.

In Figure 29 the shift lever 290 is shown as in an intermediate position between those shown in Figures 26 and 28, and wherein the smaller gear 310 on the sleeve 300 is in mesh with the gear 311 on the sleeve 303, the drives to the clutch 259 then being at the lower of the two return speeds. The clutch collar 268 will be in the position of Figure 26 in clutching engagement with the gear 267 whenever a uniform speed of rotation of the work is desired. When cutting taps or other fluted articles, however, it is desirable that the speed of rotation be relatively high while the flutes are presented opposite to the grinding wheel, since at that time the wheel is out of cutting relation to the work, and time may be saved by employing a relatively fast rate of rotation of the work during this idle period, the work being then reduced to its lower working speed when the lands between the flutes come up for engagement by the wheel. When this is desired, the clutch collar 268 is in driving relation to the sleeve 275 and during the grinding operation on the lands of the tap, the clutch 284 is in driving relation with the collar 286, so that the drive from the shaft 265 is through the pinion 276, the gear 277, the pinion 279, the gear 280, the pinion 281 and the gear 282, and from the shaft 278 to the clutch 260 through the gears 286, 288, clutch collar 268, shaft 265 and gears 270 and 271. When the flutes are presented to the work, the clutch 284 is in engagement with the gear 283 so that the shaft 278 drives the sleeve 275 through the gears 283 and 2850, the clutch collar 268, the gear 270 and 271, which is at a higher rate than that during which the lands are presented to the wheel.

In order to prevent overrunning of the shaft 210 when its direction of motion is reversed, a brake mechanism may be employed, such a mechanism being shown at 315 of the multiple disk type, and having actuating pins 316 which may be pressed inwardly to apply the brake. This is done simultaneously with the actuation of the clutch bar 262 and by a semi-annular yoke member 317, shown in dotted lines in Figure 27, which is journaled on a shaft 318, this shaft being shown also in Figures 26, 28 and 29. Referring to Figures 7 and 27, the yoke 317 has a forked extremity 320 which straddles a push rod 321 and is engaged by a disk 322 (Figure 7) secured to this rod on one side. The opposite side of the disk 322 is engaged by one end of a brake-applying spring 323, which surrounds and is guided by a pin 324 projecting from one end of the rod 321 and which is slidably guided in a part 325 of the gear casing head 326, which also forms an abutment for the opposite end of the spring 323. This push rod 321 has bearing on its opposite end an adjustable abutment screw 327 (see Figures 7 and 7b) secured to a bell crank lever 328 fulcrumed at 329. One arm 330 of this bell crank lever has a cam face 331 provided with a cam depression 332. Against this cam face rides a cam roller 333 journaled in an extension 334 of a shifter yoke 335 (see also Figures 11 and 25) on the lever 336, which controls the reverse direction clutches 259 and 260. Thus, as the lever 336 moves from either of its extreme positions, in which one or the other clutches 259 or 260 is in clutching relation, through the intermediate neutral point, the spring 323 is permitted to apply the brake 315 since at its intermediate point the cam roller 322 rides in the cam depression 332. As the lever 336 is thrown to either extreme position, the roller 333 rides out of the depression and presses the bell crank lever in a direction to move the bar 321 to the right, as shown in Figure 7, thus to release the brake.

The two sliding gear sleeves 233 and that carrying the gears 237 and 238 on the splined portion of the shaft 230 are actuated by the shifter forks 340 and 341 secured to the axially movable bars 342 and 343, respectively, and these are actuated by any suitable form of control mecanism which may be provided with an actuating handle 344 (see Figure 30) on the outside of the machine. The particular details of this mechanism form no part of the present invention. The nine different angular positions of this handle 344, corresponding to the nine different speed changes which may be produced by the shifting of these two slidable gear elements, are shown in the nine spaces longitudinally of the dial plate illustrated in Figure 14, both for the forward and reverse speed positions of the reversing clutch lever 336.

The position of the clutch collars 268 and 284 are controlled by the axial movement of the two control bars 350 and 351. Each of these bars is provided adjacent to its outer end with spaced nuts 353 backed up by check nuts 354. Straddling the bar 350 between its nuts 353 is the forked extremity of a lever 355 (see Figure 32a) which is fulcrumed on a pivot shaft 356, and attached to this lever 355 is a handle 357 by which it may be actuated. Similarly the rod 351 has a forked extremity of a lever 358 riding between its stop nuts 353, and this lever 358 also is provided with a handle 359. The dial plate of Figure 14 also shows for each of the nine angular positions of the handle 344, the feed speed of the work for each position of each of the handles 357 and 359 and the two operative angular clutching positions of the hand wheel 297, the indicators A, B, and C, D indicating positions of the handles 359 and 357, respectively, and X, Y and Z indicating positions of the hand wheel 297.

Beside the handle 359, the lever 358 is provided with an extension arm 360 forked at its extremity to receive between the forked portions the end of a bar 361, the bar and the arm being pivoted together by the pin 362. The bar 361 is connected through a link 363 with an arm 364 secured to a rock shaft 365, to the upper end of which is attached an arm 366 which is connected by means which will later be described for automatic actuation of the clutch shifting rod 351. This connection produces the flute jumping rotation of the work.

Both of the arms 355 and 358 are acted upon by a load and fire mechanism, which tends to hold each in one or the other of its extreme positions. Such a load and fire mechanism is shown in Figure 32 as applied to the lever 358 and comprises a wedge-shaped block 370 fixed thereto, with which engages a similar spring pressed wedge-shaped block 371, which forms a latch mechanism so that when the lever 358 is swung to bring the apex of the block 370 past the apex of the block 371 in either direction, the spring 372 acting on the block 371 tends to throw the lever completely over to its opposite extreme position. A similar load and fire mechanism is shown in dotted lines in Figure 31 at 373 for the arm 355.

*Carriage traverse mechanism*

The carriage 3 is driven by rotation of the lead screw 400 (Figure 1). This lead screw 400 is carried by the traversing carriage 3 and passes through a nut 401, which is held against axial movement relative to the bed of the machine, but can be rotated by hand in order to line up the grooves which are to be ground with the grinding wheel. This may be done by the turning of a shaft 402, which projects out on the front face of the machine where it has attached thereto a hand wheel 403 provided with a handle 404. A spiral gear 405 on the shaft 402 meshes with a similar spiral gear 406 secured to or cut into the lead screw nut 401. This lead screw is rotated from the shaft 220 by which the work holder is rotated, this being done through the gear mechanism contained within the gear casing 221, and various arrangements of drive may be employed, depending on the particular type of work which is being handled by the machine.

As shown in Figures 1 and 4, the gear arrangement within the box 221 is for grinding right hand threads and is through a chain of gears from the shaft 220, comprising the gear 410 on the shaft 220 meshing with a gear 411, which in turn, meshes with a gear 412 on a shaft 413. The shaft 413 has another gear 414 thereon which meshes with a gear 415 on the stub shaft 416, which is mounted on a hanger 417 supported on the shaft 413. This shaft 416 carries a gear 418 which meshes with a gear 419 fixed to the lead screw 400. The gear 412 drives the gear 222 journaled on the shaft 56 and which may be clutched thereto by the hand control clutch 420, which permits the hand disconnection or connection of the spindle drive. This facilitates grinding work with multiple threads. For example, the clutch may have twelve teeth. After one of the multiple threads is ground, the clutch is then opened and the hand wheel 403 is rotated six teeth for a double thread, four teeth for a triple thread and three teeth for a quadruple thread, so that the next of the multiple threads may be ground. Gears of various sizes may be employed to determine the speed of rotation of the work for any given speed of the shaft 220, so that the rotational speed of the work will be correct for the lead of the screw to be ground.

When it is desired to grind left hand threads the arrangement shown in Figure 5 is employed. The bracket 417 is removed from the shaft 413 and is hung on a shaft 425, which carries a gear 426 meshing with a gear 412, but which in the arrangement shown in Figure 4 is idle. In the arrangement shown in Figure 5 for left hand threads, this gear 426 drives the change gear 415 on the stub shaft 416 and the gear 418 on this stub shaft drives the gear 419 as before, but in the reverse direction relative to the rotation of the shaft 220.

Another arrangement for the lead screw drive will be described later under the heading "Hob grinding."

*Traversing carriage and spindle reverse control mechanism*

The reversal of the carriage traverse and spindle rotation is done by power. As the work carriage 3 approaches either end of its stroke, one or the other of a pair of stop dogs 500 (see Figure 1), each adjustably clamped along a guide bar 501 on the forward face of the carriage 3, engages an arm 502 having a follower roll 503 so journaled thereon as to be struck by an inclined portion 594 on one or the other of the dogs 500. This arm 502 is fixed to a rock shaft 505 which extends out on the forward face of the machine where it has attached thereto a handle lever 506 by which it may be actuated by hand whenever desired. The rock shaft 505 has fixed thereto an arm 507 which is pivoted to the upper end of a rod 508 normally held raised as by a spring 508a. This rod 508 is pivoted at its lower end to one arm of a lever 509 pivoted on a stud shaft 510 (see also Figures 35 and 35a). The opposite end of the arm 509 is provided with a hardened wear piece 511 (Figures 33, 33a, 35, 35a and 36a), over which may ride at certain times a similar piece 512 on an arm 513 forming part of a yoke 514, the branches 515 of which engage on either side of a hub 516 and are fulcrumed on a pin 517, which extends through the hub 516 and a rock shaft 518 on which the hub 516 is mounted (see Figures 33 and 37). The hub 516 has integral therewith a lever 520 having a cam roller 521 journaled at its upper end, and a spring 522 surrounding a rod 523 bears against its opposite end. The reduced inner extremity of the rod 523 passes through a perforated boss 524 on the lower end of the lever 520, and the other end portion of the rod 523 is threaded through the wall member 525 and secured in adjusted position therein by means of a nut 526. By turning the rod 523, which has a squared outer end at 527 for this purpose, the tension of the spring 522 may be adjusted. The cam roller 521 rides on the periphery of a cam member 530 and is pressed toward it by the spring 522. This cam member, as shown best in Figure 43, is slidable on a sleeve 531 keyed to a lay shaft 532. This sleeve 531 has a flange 533 at one end, and the cam member 530 is resiliently held normally spaced from the flange 533 by a pair of coil springs 534 seated at opposite ends in sockets 535 and 536 in the confronting faces of the cam 530 and the flange 533. The cam 530 is held for rotation with the flange 533, as by means of a pair of pins 537, which are slidable in openings 538 arranged parallel to the axis of the cam 530, and secured as by set screws 539 in openings in the flange 533. The cam 530 is thus mounted to rotate with the lay shaft 532 and is movable axially thereof. This lay shaft is for the purpose of controlling the initiation of reverse motion of the traversing carriage and work rotation, and rotates one-half a revolution each time during the latter part of which the connections are made for such reverse motion. Initiation of this motion of the lay shaft is produced as the carriage nears the end of each traverse, and as will later appear, when truing of the wheel is effected, such truing takes place during the completion of the rotation of the lay shaft through one-half a revolution and may involve a dwell before such completion, as it is permitted to finish its half revolution only after the truing has been finished. Thus depression of the rod 508 at the end of the traverse of the carriage rocks the rock shaft 518. This shaft 518 carries an arm 540 which carries at its outer end a pair of pins 541 and 542. The pin 541 is adjustably fixed in the end of the arm 540 and when the arm 540 is in its forwardly rocked position, its inner end engages the edge face cam 543 of a cam collar 544, which is secured to a shaft 545 (see Figures 33 and 36). This shaft 545 is slidable axially, being guided at its left hand end (as seen in Figure 36) within a socket 546 in one end of a shaft 547 journaled in bearings 548 in frame members 549. To the shaft 547 is secured a gear 550 with which meshes a pinion 551 on the shaft 206 (see Figure 25), so that the gear 550 is constantly driven by the motor 200. The end of the shaft 547 adjacent to the gear 550 is provided with a clutch element 552 with which may cooperate a clutch element 553 secured to the shaft 545, whenever the pin 541 is in engagement with the depressed face portion 554 of the cam collar 544, but whenever the shaft 545 is in such angular position that the pin 541 rides on the high part of the cam face, as shown in Figure 36, the shaft 545 is withdrawn from clutching engagement with the gear wheel 550. A spring 560 surrounding the shaft 545 between the cam collar 544, and the adjacent bearing 561 acts to throw the shaft 545 into driven relation to the gear 550 whenever it is permitted to do so. The pin 542 is a spring pressed locking pin and its inner end engages a notch 565 in the periphery of the cam collar to stop the rotation of the cam collar with the shaft 545 in a definite angular position whenever the shaft 545 is brought out of clutching relation to the driving gear 550.

The right hand end of the shaft 545, as shown in Figure 36, carries a long pinion 570 which meshes with a gear 571 on the lay shaft 532, so that it is maintained in mesh with the gear 571 throughout the axial motion of the shaft 545. The shaft 547 to which the gear 550 is secured is part of the drive for the wheel truing mechanism, and will be referred to more in detail under the heading "Wheel truing operating mechanism."

Adjacent to the gear 571, the lay shaft has fixed thereto a cam 572, which has a cam groove 573 therein within which rides a follower roll 574 journaled at the lower end of the lever 336, which actuates the reverse clutches 259 and 260 within the gear box 209. One-half a revolution of the lay shaft 532 acts to throw the lever 336 from one to the other of its extreme positions, and in an intermediate position the clutches are in neutral, this being the position during a dwell at each end of the stroke, during which dwell whenever the wheel is to be trued, the truing is completed, as will later be described. This lay shaft 532 also controls by its rotation the feed and retractive motions of the grinding wheel, which will be considered more in detail under "Wheel slide actuating mechanism." It will thus be seen that each time the rod 508 is depressed at the end of a traverse of the carriage 3, the arm 540 is rocked to withdraw the pin 541 from the cam collar face and allows the shaft 545 to become connected for rotation through the gear 550, whereupon the lay shaft is rotated for one-half a revolution, at the end of which half revolution the shaft 545 is again disconnected from clutching engagement with the gear 550, at which time reversal of the direction of motion of the work carriage has been effected through the shifting of the clutch lever 336. The completion of this half revolution of the lay shaft may, however, be prevented for a time, this being done in order to complete the truing of the wheel, which again will be more fully explained later.

Means are provided for stopping the lay shaft at the end of its half revolution. The cam roller 521, in the stopped position of the lay shaft when either one or the other of the direction control clutches is in operation, and the pin 541 is in stopped position with the shaft 545 unclutched from the gear 550, rests in either one of two arcuate depressions 580 in the cam element 530, but as soon as the arm 540 has been swung outwardly to permit the shaft 545 to move into clutching position, the cam element 530 starts its rotation, and its cylindrical periphery engaging the cam roller 521 holds this cam roller and its carrying arm 520, and also the clutch pin arm 540, out of engagement with the cam collar 544 until the other depression 580 comes opposite to the roller 521, unless it is stopped earlier, as will later be fully described.

In order to prevent any accidental motion of the handle 506 from interfering in any manner with this motion of the lay shaft, a safety device has been provided. It will be noted that the member 512 with which the member 511 engages, and which is lifted to withdraw the cam pin 541 from the clutch collar, is mounted through its pivotal connection on the pin 517 to swing about a substantially horizontal axis, although it is normally held in a plane to bring it within the path of motion of the member 511, as by a spring 585, which connects a pin 586 on the yoke member 514 with a frame part 587. This pin 586, as shown, is the journal for a cam roll 588 which bears against the right hand face of the flange 533. This end face of the flange 533 has a pair of diametrically oppositely disposed arcuate recesses 589 in which the roller 588 may ride, but only when the lay shaft is in one or the other of its stopped positions, when either one or the other of the clutches 259 or 260 is in operative condition. At any other time in the rotation of the lay shaft, the member 512 is forced out of position above the element 511 into the dotted line position of Figures 35a, and 36a, whereupon depressing of the rod 508 is ineffective to operate it in any way.

Wheel slide actuating mechanism

As hereinbefore noted, the grinding wheel is mounted on the carriage 113, which is movable from and toward the carriage 3 transversely thereof, being mounted, as previously pointed out, on a series of rollers 126. The motion of the wheel toward the carriage 3 is effective to feed the wheel toward the work, and in order to provide for an accurate final dimension of the work, it is necessary not only to feed the wheel the distance corresponding to the size of the work, but also a further distance to compensate for the amount of wheel removed in the truing operations. Provision is made in accordance with this invention for individually adjusting both the amount of truing and the amount of normal feed of the wheel, but the two are so superimposed that the total feed of the wheel is increased from its normal feed by the amount trued. The normal feed of the wheel is produced at either one or both ends of the traverse of the carriage, and this feed is effected, as shown, by the rotation of the lay shaft 532 during its half revolution after the carriage has completed its stroke in either direction. To this end the lay shaft has secured thereto a cam 600 having a peripheral cam groove 601 therein within which rides a cam follower roll 602 journaled on an arm 603 and carried by a rock shaft 604. This rock shaft extends through the forward wall of the machine base and carries on its outer end a rocking bar 605 (Figures 1, 10, 51 and 53). This bar 605 is formed with a T-slot 606 extending longitudinally thereof and open at the front and within this slot either one or two feed dogs 610, depending on whether feed at one or both ends of the traverse is desired, may be adjustably fixed. Each feed dog is provided with a head 611 which is in threaded engagement with a screw 612, the head of which rides in the undercut portion of the T slot 606. Positioned immediately above the heads 611 are a pair of arms 613, 614, respectively, fulcrumed at 615, and 616, respectively. These arms 613 and 614 overlap at their inner ends and one, as the arm 613, has a pin 617 secured thereto, which rides in a slot 618 in the end portion of the other arm 614. This pin passes through the lower end of a feed actuating bar member 619 provided with a rod 620 projecting from its upper end and slidable axially therein. The arms 613 and 614 are so positioned as to be engaged by that head 611 beneath it, so that as the bar 605 is rocked, either one or the other of the arms 613 or 614 is rocked, there being one upward rocking movement of these arms and the bar 619 when a feed dog is employed at each end of the bar 605 for each direction of rocking of the bar 605, and one upward rocking motion in one direction only of rocking of the bar 605 when one or the other of these feed dogs is removed. A spring 625 surrounds the rod 620 and bears at its lower end against the upper end of the bar 619, and at its upper end against a nut 626 threaded on the upper end of the rod 620. The upper end of the rod 620 is threaded into a bar 627, the upper end of which is pivoted to an arm 628 fulcrumed on a stub shaft 630 (see Figures 7 and 50), the arm 628 having a hub portion 631 journaled on an enlarged portion of the shaft 630. This enlarged portion forms a shoulder against which rests a ratchet wheel 632 which is frictionally held on a sleeve 633. The arm 628 carries a ratchet pawl 635, which engages the teeth of the ratchet wheel 632, so that by the up and down motion of the feed rod 620 the ratchet wheel is caused to rotate in one direction step by step. The sleeve 633 has integral therewith a pinion 636 which meshes with a gear ring 637, which is clamped between two annular members 638 and 639. The member 638 has a hub portion 640 keyed to a sleeve 641, which is threaded onto a screw 642, which is a part of a non-rotatable but axially movable bar 645. As shown in Figures 7 and 9, this holding of the bar 645 against rotation is effected by it being pinned to an arm 647, slidably engaging the stationary bar 647a secured at its ends in portions of the machine frame.

Surrounding the sleeve 641 is a second sleeve 646, this sleeve being non-rotatable and there being a thrust ball bearing 647 (Figure 7a) between the outer portion of the sleeve 646 and the hub 640 of the member 638. Extending from diametrically opposite points from the sleeve 646, are a pair of pivot pins 648 on which is journaled a double armed lever 649, which has a central opening through which the sleeve 646 extends (see Figures 7, 11 and 12). This lever may be rocked at suitable times by former cams to produce an in and out motion of the bar 645 and a corresponding motion of the wheel slide 113, the purposes of these being later described. The rear end portion of the bar 645 is reduced and threaded as at 655, the threaded portion engaging in a nut element 656 having a sleeve portion 657 which is slidably and nonrotatably mounted on a splined portion 658 of a rotary shaft 659. Shaft 659 is journaled for rotation, but is held against axial motion by the collar 659a secured thereto between portions of the machine frame.

The sleeve portion 657 is journaled for rotation in a portion of the slide 113.

In order to take up backlash of the wheel-carrying slide, means are provided for yieldingly holding it at its extreme backward limit of motion. As shown in Figures 7 and 11, this means comprises a pair of chains 660, each secured at its forward end to a lug 661 projecting from the slide 113, and passing backwardly through the frame openings 662 over a pair of sprocket wheels 663 journaled on a shaft 664, these chains being suitably secured to the sprocket wheels at their rear ends. Between the sprocket wheels 663, the shaft 664 carries thereon a smaller sprocket wheel 665, about which, and secured at its rear end thereto, passes a chain 666, the forward end of which is secured to a spring 667, the forward end of which, in turn, is secured to a fixed part of the machine bed as at 668. Thus the spring 667 tends to rotate the shaft 664 in a direction to apply tension to the chain 660 in a direction to hold the carriage 113 rearwardly as far as is permitted by its controlling mechanism.

Neglecting the effects of rocking of the lever 649 and the rotation of the nut 656, it will be noted that the extent of feed of the wheel slide or carriage is dependent on the extent of rotation of the ratchet wheel 632. This in turn, is dependent on the amplitude of stroke of the rod 620, which, in turn, is determined by the position of the feed dog or dogs 610. If these dogs are positioned nearer to the axis of the shaft 604, the feed at each actuation is less, while if they are positioned away from this axis, this amount of feeding is greater. If either one of the dogs is removed, no feed will take place at the corresponding end of the traverse. Thus it will be seen that the feed is selectively at either end of the traverse and adjustable in amount independently at each end. By rotation of the ratchet wheel 637, the nut portion 641 is rotated, thus to move the bar 645 forwardly, and through its connections with the nut 657 and the wheel slide, to move the slide forwardly with it.

This feeding action may be modified by moving either or both arms of the lever 649. For example, if it is desired to grind to a taper lengthwise of the work, the upper portion of the lever 649, which may be provided with a cam follower 670, may ride on the outer face of a former cam 671 secured to the slide 3 and having an edge contour cooperating with the follower 670 corresponding to the desired taper or other longitudinal contour of the work. Such contour may have both straight and taper portions or be of any other desired shape. Traverse of this former cam with the work carriage will cause the upper end of the lever 649 to move in and out correspondingly to the contour of the former, it being held thereagainst by the spring 667 which draws the slide rearwardly as far as it is permitted to go by the controlling mechanism. The pins 648, which move at a less amplitude than the cam follower 671, transmit their in and out motion directly through the bar 645 to the wheel slide.

Immediately below the former cam 671 in Figure 11, is shown a second former cam 675 which may be employed to give a different type of motion to the lever 649. This may, for example, be employed to give a type of motion particularly suitable when grinding hobs, or the like, where the work is provided with circular rather than helical circumferential ridges. This will be more fully described under the heading of "Hob grinding."

A third former cam positioned at the lower end of the lever 649, and shown at 680, may be employed, and this may be used when one-way grinding rather than two-way grinding is desired in order to retract the wheel slide during the return idle traverse of the tool carriage 3. It may be used also to move the wheel slide during the grinding of lands on fluted work as will be described under the heading "Tap relieving." Details of the control of this former cam are shown in Figure 8. The lower end of the lever 649 is shown as provided with the cam follower 681, this follower riding on the forward face of the former cam 680. This former cam 680 is provided with a lug 682 at one end, perforated for the reception of a threaded rod 683 on which are the check nuts 684 and 685 on either side of the lug 682, so that this lug may be fixed in adjusted position along the rod 683. The inner end of the rod 683 is threaded into a bar 686, a check nut 687 being employed to fix the rod 683 in position. This bar 686 is slidably guided in a pair of perforated guide lugs 688 projecting from a plate 689, bolted or otherwise secured to the forward face of the machine bed. Fulcrumed on a bolt 690 extending through the bar 686 is a lever 691, which has an opening 692 through which the bar 686 passes.

This lever 691 is shown best in Figures 1, 46 and 47. At its lower end this lever 691 is pivoted to a link 695. The opposite end of the link 695 is journaled on an eccentric 696 of a shaft 697, which extends through the front frame of the machine and carries on its rear end a pinion 698 (see Figure 1b). This pinion 698 is in mesh with a segment gear 699 journaled on a pivot pin 700. As shown in Figures 10 and 35, this segment 699 has a downwardly extending arm 701 provided with a cam follower 702 with which cooperates an edge cam portion 703 on the cam 680. The segment 699 has attached thereto, as at 704, a coil spring 705, the opposite end of which is attached, as at 706, to a fixed part of the frame.

In Figure 35 a pin 707 is shown projecting from the machine frame, and against which the segment 699 is held by the spring 705 with the cam follower 702 at its extreme right hand limit of motion, in which position the edge cam 703 may ride therepast without effecting any movement of the segment 699 and thus without rotating the pinion 698 and thus without affecting the link 695, so that the lever 691 is then effectively fulcrumed on its pivotal connection with this link. This is the position of the parts for two-way grinding where the grinding wheel is not retracted during a return traverse. For one-way grinding the pin 707 is removed, whereupon the spring 705 is effective to hold the cam follower 702 in contact with the cam face 703, so that as the lay shaft 532 is turned from one of its normal idle positions to the other idle position 180° distant, the cam segment 699 is rocked between two extreme positions, thus rocking the shaft 697 and changing the position of the lower end of the lever 691 between either of two positions effective to slide the bar 686, and thus to move the former cam 680 between the position shown in Figure 8, where the cam follower 681 rides somewhat below the high point of the cam 710 of the former cam 680, and another axial position of the bar 686, corresponding to the opposite direction of traverse, wherein the cam follower 681 rides against the lower portion 711 of the former cam, the wheel slide then being retracted from the work by reason of the spring 667 which pulls the slide 113 back. Where no relief, as on the lands of taps, or the like, is desired the follower 681 may ride on the high point of the cam 710 rather than somewhat below the high point, so as to give the greatest possible accuracy during the guiding traverses, and it may drop back sufficiently on the cam slope toward the low point to withdraw the wheel from the work for the idle traverse. Such relief is more fully described under the heading "Tap relieving."

When neither taper grinding, hob grinding, tap relieving, nor one-way grinding is desired, the former cams may be removed, whereupon the lever 649 engages solidly against the end of a bushing 712 within which the sleeve 646 is slidable, and which is fixed in the forward frame member of the machine. The feed of the wheel is then dependent entirely on the motion of the feed wheel 637, modified by the truing mechanism feed, which will be further described.

The wheel feed may be produced by hand, if desired, the sleeve 633 having keyed thereto a hand wheel 715. The limit of feeding motion is determined by a stop lug 720, secured to the rear face of the gear ring 637, and which at the limit of feed motion impinges on a stop 721 fulcrumed at 722, and yieldingly held in stopping position by means of a spring 723. This spring is secured at one end to a pin 724 projecting from the stop 721, and at its other end to a pin 725 secured to another pivoted member 726 fulcrumed at 727, and having to do with the amount of truing which it is intended to give to the wheel and which will be further described later. After the stop 720 has impinged against the member 721, further feed of the wheel independent of the wheel truing is prevented, and any further actuation of the feeding mechanism results only in compressing the spring 625, the rod 620 sliding in the member 619 idly.

Tap relieving

The upper portion of the lever 691 may be actuated to impart a further modification of the tool slide position, as for the purpose of relieving taps, so that back of the cutting edge of each land the grinding is slightly deeper so as to provide clearance between the back portions of the lands and the work when the taps are being used. It is thus necessary to move the wheel carriage forwardly slightly during the rotation of the work from the time when the wheel first engages at the cutting edge of the lands to where it leaves the lands at the succeeding flute. The timing of this relieving motion must, therefore, be accurately related to the angular position of the work, and hence this is done through a connection to the work-rotating means. The shaft 210, which rotates the work, extends out on the opposite side of the gear box from its connection to the work-driving shaft 213, this extension being shown at 750 (Figures 1, 26, 28, 29), and extends into a gear box 751, shown best in Figures 73 and 74. Within this gear box 751, the shaft 750 has fixed thereto a gear 752, which meshes with a pinion 753 fixed to a shaft 754. This shaft 754 is carried in a slot 755 in a hanger 756, which may be clamped about a bearing 757. This shaft 754 also carries a gear 758, which meshes with a pinion 759 on a shaft 760 journaled in the bearing 757 and extending back into the machine. These gears 752, 753, 758, 759 are change gears for determining the rate of rotation of the shaft 760 with relation to the rotation of the shaft 750. The shaft 760 has keyed thereto a bevel gear 761 which meshes with a bevel gear 762 on a shaft 763 (see Figures 46, 47 and 48). Keyed to the shaft 763 is a sleeve 764, and to the outer end of this sleeve is keyed an edge cam 765. Riding against the edge cam 765 is a follower roll 766, which is carried at the end of an arm 767 fulcrumed on a pivot bolt 768 on a bracket 769. This arm 767 has a slot 770 (see Figure 46a) in its forward face within which rides a block 771 carried at the inner end of a bolt 772. This bolt passes through an elongated slot 773 in the upper portion of the lever 691 (Figures 1 and 46) and passes through a block 774, which has a portion of reduced width at its back face engaging in a guideway 775 in the forward face of the lever 691. The bevel gear 762 is shown in Figures 48 and 49 as connected through a one-way drive comprising a spring pressed block 790 which engages a milled out portion 791 in the shaft 763. This prevents relief being produced, except in one direction of traverse and rotation of the work. The block 774 may be fixed in its adjusted lengthwise position with reference to the slot 773, thus to determine the amount of lateral rocking motion of the lever 691 produced by rocking of a constant amplitude of the arm 767. The cam roll 766 is held in contact with the periphery of the cam 765 by any suitable means such as the spring pressed abutment 776 which engages a side face of the arm 691. The adjustable block 774 may be provided with a pointer 777 for cooperating with a scale 778 fixed to the arm 691 to indicate the amount of relief which will be produced by any particular setting of the block 774 lengthwise of the slot 773. This rocking of the lever 691 from the cam 765 produces a sliding motion of the bar 686, such as to move the former cam 711 betweeen a position with the follower 681 riding somewhat below the high point 710 of the cam, and one further toward the high point to an extent dependent on the setting of the block 774. Thus when each land of the tap is presented opposite to the wheel, there is a feeding motion of the wheel into the work as the land is passing the wheel. By proper choice of change gears, adjustment may be made for work having straight or helical flutes of any pitch.

Flute jumping

It is desirable when grinding taps that the speed of rotation of the work be rapid during the time that a flute is presented opposite to the wheel, and that it be relatively slow during the time that a land is presented opposite to the wheel, since when the flute is presented, the wheel is not cutting and rapid angular motion of the tap during this time saves time in the total grinding operation. Means for producing this increased speed of rotation while the flute is presented, and the decreased speed of rotation while the land is presented, is shown as actuated by the rotation of the shaft 763 (Figure 48), the driving of which has been described under the heading "Tap relieving".

The sleeve 764, heretofore mentioned, is provided with a flange 800, and between this flange and the edge cam 765 are clamped the face cam members 801 and 802 with an intermediate spacer 803 shown as keyed to the sleeve 764. These cam members 801 and 802, and the spacer 803, define between them a cam groove 804 within which rides a follower roll 805 on a rock arm 806. This rock arm is secured to a rock shaft 807 pivoted in bearings 808 on the bracket 769 (Figure 46). To one end of the rock shaft 807 is secured an arm 809 bifurcated at its upper end, and between the forks is pivoted a block 810 to which is secured a rod 811. This rod is pivotally connected at its opposite end to the arm 366 (see Figures 31 and 32) so as to actuate the clutch collar 284 in the gear casing 209 heretofore described (see Figures 26, 28 and 29) so as to throw the collar 284 to the left for jumping the flutes, and to the right for grinding on the lands.

Wheel truing mechanism, United States standard threads

This mechanism is shown in detail in Figures 10, and 55 to 63. The truing mechanism is housed within a casing 850, the forward end of which is formed cylindrical, as at 851, and projects into the cylindrical grinding wheel casing 103, and, as shown, is provided with a packing ring 852 which permits the wheel casing 103 to be rockably adjusted on its cradle mounted on the slide 113, but prevents metal particles, abrasive material from the wheel, and coolant from finding their way to the slideways of the slide 113 and 853. The casing 850 is carried on a slide 853 (Figures 10 and 13) mounted directly on the slide 113, and projects up between the wheel housing 103 and the rear portion 110 of the slide 113 in a slot through the cradle 111 between side girder portions 854, which join the portions 103 and 110. It will thus be seen that the casing 850 does not partake of the rocking adjustment of the wheel, but is moved forwardly and rearwardly with relation to the work slide therewith and also, as will later appear, independently thereof.

As shown best in Figures 55 and 56, the casing 851 is provided with a forward wall portion 860 having a reentrant central portion at 861 and inclined side wall portions 862. Through these wall portions 862 are arranged bearing sleeves 863, which are arranged between packing rings 864 and 865 enclosing between them packing 866 to prevent the passage of metal particles, abrading material, and coolant through these wall members and into contact with the mechanism housed within the casing 851. Journaled in each of the sleeves 863 is a shaft 870, which has clamped thereto an arm 871 carrying a diamond truing tool 872 at its end, eccentric to its shaft 870. By maintaining the casing 850 full of oil, the seepage of this oil out around the shafts 870 acts as a further aid in preventing the entry of grit and other foreign matter into this casing. The two shafts 870 are arranged at angles of 120° to each other so that the two diamonds 872, when the corresponding shaft 870 is rocked, are caused to traverse the inclined side faces 875 of the grinding wheel 100. One of these diamonds 872 is positioned slightly above the other, as shown in Figure 63. They are rocked to effect such traverse of the wheel faces by a cam drum 876, which has a pair of cam grooves 877 therein, each of these grooves cooperating with followers on the ends of bars 878. The forward ends of these bars are clamped to the shafts 870 so that as the rear ends of the arms 878 are moved up and down by engagement of their cam followers in the grooves 877, these shafts 870 are rocked.

In order to provide for extreme accuracy in setting, means are provided for slightly varying the angles of traverse of the diamonds across the wheel face. To this end, means are provided by which, beside the rocking motions of the shafts 870 produced by the rocking action of the bars 878, they may be given a slight axial motion simultaneously therewith. As shown this is done by prolonging the bars 878 forwardly of the shafts 870 and providing on the prolonged end of each, as at 890, a cam follower 891, which rides on a cam plate 892. This cam plate 892 is adjustably supported at either end (see Figure 61) on the adjusting screws 893 and 894 threaded through the inclined casing wall 862. By adjusting the plate 892 angularly, the forward end of the corresponding lever arm 878 may be given a motion axially of the corresponding shaft 870, moving the shaft therewith, thus to effect an axial movement of the shaft at the same time that it is rocked. The amount of this axial movement depends on the relative adjustment of the two screws 893 and 894, and it may be made in opposite directions for the same direction of rocking of the corresponding shaft 870, by tilting the plate 892 in one or the other direction from parallelism with the wall member 862. By this means a very accurate control of the inclined wall contour of the grinding wheel is made possible. The cam drum 876 is journaled on a vertical axis 896, and is arranged to be rocked in opposite directions by the rotation in opposite directions of a worm 897 engaging worm teeth 898 in a portion of the periphery of the cam 876. This worm 897 is driven through friction plates, shown generally at 899, from a shaft 900, this friction drive being interposed in order that there may be a full traverse of the diamond points, but without danger of overthrow, the shaft 900 being rotated through a sufficient angular distance to insure the rocking of the diamond points throughout their entire permissible amplitude, any further turning of the shaft 900 being taken up in slippage in the frictional connection.

It is also desirable that the diamonds be moved in contact with the grinding wheel only in a direction away from the apex of the wheel, as if it be attempted to true in the opposite direction, there is danger of chipping the wheel edge. To this end provision is made for relieving the diamonds from the wheel during their rocking motion back toward the apex of the wheel. This is accomplished by a rocking cam plate 901, which is journaled on a bushing 902 on the cam pivot 896. A pin 903 projects downwardly from the cam 876 between a pair of shoulders 904 and 905 (see Figures 56 and 58) in the cam plate 901. A second pin 906 secured in the base of the housing 850 projects between a pair of shoulders 907 and 908 on the cam plate 901. This cam plate also has oppositely disposed notches 909 having long inclined faces 910 against which ride abutment screws 911 carried at the rear ends of a pair of arms 912, the forward ends of which are fulcrumed as at 913 on the base of the casing 850. Projecting down from each of the arms 878 is a pin 914 which engages in a notch 915 in the arm 912 beneath it. During the rocking movement of the cam 876 in a direction to traverse the diamonds from the point rearwardly across the faces of the grinding wheel, the pin 903 rides from the position shown in Figure 56 in full lines to the dotted line position, whereupon further turning of the cam 876 causes a rocking of the cam plate 901 in a direction to cause the inclined faces 910 to ride out against the abutments 911, thus to swing the rear ends of the arms 912 outwardly, which, acting through the pins 914, causes the rock shafts 870 to be moved axially in a direction to retract the diamond points from their normal truing positions. The arms 912 remain in this position during the reverse rocking motion of the cam 876 until the pin 903 engages the shoulder 905 and starts to turn the cam plate 901 in the reverse direction to the position shown in Figure 56, whereupon a spring 920 (Figure 55) seated in a socket in the rear end of each of the shafts 870 and bearing on a pin 921 projecting into this socket from the base of the cup-shaped member 922 carried by the casing 850, and in which the rear end of each of the shafts 870 rides, returns the shafts 870 to their normal operative positions, and returns the abutments 911 into the notches 909 in the position shown in Figure 56. The shoulders 907 and 908 act with the pin 906 as stops to limit the extent of rocking motion of the cam plate 901.

Beside the two diamonds 872 which true the inclined faces of the wheel, a third diamond 930 is shown to true off the apex of the wheel in order to conform to United States standard threads. This diamond is shown as positioned slightly above the horizontal plane of the wheel shaft 101 (Figures 58 and 63) and it is carried by a rock shaft 931 (see Figures 10 and 58), being mounted in a holder 932 similar to the holders for the side face truing diamonds 872. The shaft 931 is mounted in a packed bearing 933 and back of this bearing it has clamped thereon, a collar 935 having a pair of cam rollers 936 journaled on studs projecting therefrom. These cam rollers ride on a peripheral cam ridge 937 on the upper face of the cam 876 (Figures 57 and 58), so that as the cam 876 is rocked, the shaft 931 is rocked to cause the diamond 930 to pass across the apex of the wheel. This rock shaft 931 is pressed forwardly toward the wheel 100, as by a spring 940 seated in a socket 941, and reacting against a plug 942 which bears at its outer end against a key pin 943 extending through oppositely disposed slots 944 of the rock shaft 931. Against the opposite face of this key pin 943, is a second plug 945 against which may bear the threaded extremity 946 of a micrometer adjusting screw 947. The spring 940 holds the inner end of the screw 947 against the pin 943, and by adjusting the screw 947, the limit of inward axial position of the shaft 931 may be adjusted to determine the amount of the apex of the wheel which will be removed by the diamond 930.

Wheel truing mechanism buttress threads

In Figures 64 to 68 a modification of the truing mechanism is shown intended for grinding buttress threads and where the threads extend so close to a shoulder on the work that one face of the grinding wheel must be trued off to permit the grinding wheel to work up sufficiently close to the shoulder. The side face dressing diamonds with this mechanism are arranged in the angular relationship shown in Figure 64. Other than this changed angular relationship, the mounting and actuation of the side diamonds from the rocking cam are the same as that for the United States standard threads as previously described.

The rock shaft 931a, which carries the apex truing diamond 930a, has secured thereto a cam arm 965 having a roller 966 riding on the top of the cam 876a, which is provided with a cam indentation into and out of which the cam follower 966 rides in order to impart the desired rocking motion to the shaft 931a when the cam 876a is rocked. The shaft 931a otherwise may be mounted similarly to the shaft 931 shown in Figure 58.

A fourth diamond 950 for dressing out one side of the grinding wheel is employed in this construction. This diamond 950 is carried by a vertical rock shaft 951 (Figures 64, 66 and 67). This rock shaft 951 is suitably journaled in upper and lower spaced bearings 952 and 953 and just beneath the bearing 952, this shaft 951 has fixed thereto an arm 1953, which has a head 954 (see Figure 67) riding in a slot 955 in the end of a horizontal bar 956 which is slidable axially in a pair of bearings 957 and 958. The top of the rocking actuating cam 876a is provided with an upwardly extending pin 960, which engages a collar 961 on the bar 956 and this collar 961 is held in contact with the pin 960 by the coil spring 962 surrounding the bar 956 and bearing at one end against the bearing 958 and at the other against the collar 961. Rocking of the cam 876a thus moves the bar 956 axially and rocks the shaft 951 and the diamond 950.

The fourth truing diamond in its motion hollows out the side face of the grinding wheel as at 980 (shown in Figure 68), so that the grinding wheel is enabled to work up to threads close to a shoulder on the work.

Wheel truing operating mechanism

The shaft 900, which actuates the truing mechanism, is connected through a universal joint 1000 (see Figure 10) with an inclined shaft 1001, which, in turn, is connected through a universal joint 1002 with a shaft 1003. This shaft 1003 has thereon a sprocket gear 1004 from which a sprocket chain 1005 extends about a sprocket wheel 1006 (Figures 2 and 4). This sprocket wheel 1006 is carried on a shaft 1007 and it is driven through intermeshing gears 1008 secured to the shaft 1007 and 1009 secured to a shaft 1010. This shaft 1010 extends forwardly of the machine, as shown in Figure 4, and, as shown best in Figure 34, its forward end is journaled in a bearing 1011 and carries on its extreme end a bevel gear 1012. This gear 1012 is in mesh with a pair of bevel gears 1013, 1014 (Figure 36), each of which is journaled on the shaft 547. Splined on this shaft 547 is a clutch collar 1015, which may be shifted into shifting engagement with either of the wheels 1013 and 1014, this shifting being accomplished through a bell crank lever 1016, one arm of which is forked and has rollers 1017, which ride in a groove 1018 of the clutch collar 1015. The opposite arm of this bell crank lever 1019 rides in a slot in a shift rod 1020. The forward end of the rod 1020 is secured, as by a threaded connection, into an enlarged diameter member 1021 provided with an enlarged head 1022 at its forward end (see Figure 54). Means, which will later be described, cooperate with this head to hold the clutch collar in neutral position, except when wheel truing is to take place.

As shown best in Figure 4, the rear end of the shift rod 1020 is pivoted to an arm 1025 fixed to a rock shaft 1026. This rock shaft 1026, as best shown in Figure 6, carries an arm 1027 on the outer face of the machine of a load and fire mechanism, with which cooperates a spring latch member 1028 of a bell crank lever 1029, which is fulcrumed at 1030. This fulcrum 1030 is at the outer end of a shaft 1031, the shaft 1031 carrying on the outside of the machine, a disk 1032 provided with an annular groove 1033 therein in which may be fixed adjustable therearound a pair of reversing dogs 1034, which are on opposite sides of the latch arm 1035 of the bell crank lever 1029.

Within the machine frame the shaft 1031 has fixed thereto a worm wheel 1036 (see Figures 2 and 4) and in driving relation to this worm wheel is a worm 1037 on the shaft 1007, thus when the shaft 1007 has rotated the worm in one direction until the impingement of one of the stop dogs 1034 on a latch arm 1035 has thrown the arm 1029 in a direction to snap the reverse actuator arm 1027 in the opposite direction between the stops 1037, the direction of rotation of the shaft 1031 is reversed. This reverses the direction of drive of the truing device actuating shaft 900.

Truing wheel feed mechanism

Provision is made by which the grinding progresses to a definite extent without the truing device coming into action, after which the truing device is actuated at one or both ends of the traverse, as may be selected, and the wheel feed is also effected by the truing device feed, so that no matter to what extent the wheel is trued, the wheel edge arrives at the same position relative to the axis of the work, and the machine is automatically stopped when it has reached this position. This mechanism will now be described.

The feed gear ring 637 (Figures 7, 7a, and 50) described in connection with the wheel feed, is provided with an annular groove on its forward face, so that there may be adjustably secured in any desired angular position thereon a truing control block 1050 and after the feed of the grinding wheel has proceeded to the desired extent, somewhat short of the final size position and before its further rotation is stopped by the block 720 on the stop member 721, as shown in Figure 50, this block 1050 has engaged and depressed a latch block 1051 (see Figures 1 and 50). This latch block 1051 is carried at the end of a rock arm 1052 fulcrumed at 1053, and secured at its upper end to this rock arm is a rod 1054, which extends down through a guide bearing 1055 through which it is slidable, its lower end engaging a rock arm 1056 on a rock shaft 1057.

Referring to Figure 35, it will be seen that the rock shaft 1057 has secured thereto a crank arm 1058 provided with a slot 1059 in its end. Riding in this slot is a pin 1060 on a rock shaft 1061 arranged at right angles to the rock shaft 1057. This rock shaft 1061 carries an arm 1062 provided with a cam follower roll 1063 (see Figures 33, 35, 39 and 41). When the bar 1054 is depressed after the grinding has proceeded to the desired extent without truing, so as to rock the shaft 1061, the cam follower roll 1063 is brought opposite the end of the cam member 530 (see Figures 38 to 41). The follower roll 1063 is then in the path of an edge cam 1064 on the end of the cam member 530, so that when the lay shaft 532 rotates, the impingement of this cam member 1064 against the cam roll 1063, forces the cam member 530 axially of the lay shaft 532 against the pressure of the springs 534 into the position of Figure 41. It will be noted that intermediate the arcuate depressions 580 in the cam member 530 are other similar arcuate depressions 1065, which may be more or less blocked off, as desired, by filler blocks 1066 (see Figures 39 and 41). Each of these filler blocks is shown as secured in position, as by a screw 1067, which is arranged nearer one end of the block 1066 than the other, so that the block may be secured either end to in its depression. Where the short end is facing the left hand end of the cam member 530, as shown in Figures 39 and 42, a portion of the left end of the corresponding recess 1065 is open as at 1068, and when the cam member 530 has been pushed to its right hand position, this open portion 1068 lies in the plane of the cam roll 521 on the stop shaft arm 520, so that the arm 540, which carries the clutch controlling pin 541, may drop into position to unclutch the shaft 545 from the driving gear 550 so as to stop the lay shaft after it has passed its normally stopped position by approximately 120°, as shown, for example, in Figures 44 and 45, between the radial lines marked f and k. During this extent of rotation of the lay shaft, the wheel feed actuating rock bar 605 has been rocked for a feeding action, but whether or not feed has actually taken place at this time, is dependent on whether or not the corresponding feed dog 610 has been in position, and whether or not the stop block 720 has impinged on the stop arm 721. In two-way grinding, the diagram for which is shown in Figure 44, in which there is a feed at each end of the traverse, the feed has taken place, unless previous to that time further feed has been stopped by the impingement of the stop block 720 on the stop arm 721.

When the cam member 530 has been pushed to its right hand position for truing, the truing also has been initiated before the stopping of the lay shaft prior to completing 180° rotation. This was accomplished by the impingement of a cam element 1070 (Figure 41) removably secured in a recess 1071 in the periphery of the cam member 530, now in its right hand position on a cam follower roll 1072 carried by a lever 1073 pivoted at 1074. To the opposite arm of this lever 1073, as shown best in Figure 35, is pivoted a rod 1075, the opposite end of which is pivoted, as at 1076, to an arm 1077 secured to a rock shaft 1078. This rock shaft extends through the forward face of the machine and carries on its forward end, as shown in Figures 1, 51 and 53, a rock bar 1079 having a T slot 1080 arranged lengthwise thereof within which may be adjustably secured a truing feed actuating dog 1081. Adjustment of this dog lengthwise of the slot determines the amplitude of motion of this dog when the bar 1079 is rocked. It impinges on the lower face of a rocker 1082 and to which is secured a bar 1083. A rod 1084 is slidably guided in a socket in the upper end of the bar 1083 and a spring 1085 surrounds the rod 1084, and bears on its lower end against the upper face of the bar 1083, and at its upper end against a nut 1086 threaded on this bar, and acting as a lock nut to secure its upper end in a bar 1087. Thus, as the rocker 1082 is moved upwardly, force is transmitted through the spring 1084 tending to cause the bar 1087 to partake of the same motion as the bar 1083. The upper end of the bar 1087 is pivoted to an arm 1088 fulcrumed on a shaft 1089 (see also Figure 7). This arm 1088 carries a ratchet pawl 1090, which cooperates with ratchet teeth on a ratchet wheel 1091 secured to a sleeve 1092 keyed on the forward end of the shaft 1089. The forward end of this shaft is shown as squared for the reception of a hand wheel or wrench, or other suitable device, by which the shaft 1089 may be turned when desired.

Frictionally mounted on the collar 1092 (Figures 7 and 50) is a two-part ring member 1095, the two parts being adjustably clamped together to adjust their frictional hold on the sleeve 1092. One of the parts of this member 1095 carries a stop arm 1096 (Figure 50), which may engage a stop lug 1097 on a stop bar 1098 adjustably secured as through a bolt and slot connection to the forward face of the machine. In Figure 50 this stop arm 1096 is shown as in contact with the lug 1097, this representing the start of the feed motion of the truing devices, since it limits the backward turning motion of the truing device feed shaft 1089. The feed may take place from this point until a stop pin 1100 on an arm 1101 of the member 1095 strikes a limit switch stop arm 1102 on a limit switch 1103. This limit switch 1103 is arranged in parallel with a limit switch 1104, the arm of which is struck by an extension 6050 from the feed block bar 605 (Figure 53), when the carriage is at one end of its traverse, and when both of these switches 1103 and 1104 are thus struck, power to the motor 200 is cut off, so that the motor 200 stops only after the truing feed has reached its limit and the traversing carriage is at one end of its stroke. The setting of the stop bar 1098 thus serves to determine the total amount of feed of the truing devices. The initial position of the truing feed devices, determined by the impingement of the arm 1096 against the stop 1097, may be produced by rotating the feed hand wheel 715 in a direction to retract the wheel from the work, the stop lug 720 on the feed wheel gear ring 637 contacting, after the wheel slide has been retracted for some distance, with the bar 726 (Figures 50 and 52), which is pivoted on a lever 1105 fulcrumed at 1106, one arm 1107 of this lever having pivoted thereto the upper end of a slotted link 1108, in the slot of which rides a pin 1109 on an arm 1110 carried by the ring member 1095. When this link 1108 is depressed to a sufficient extent, the upper end of the slot engages the pin 1109 and rocks the member 1095 into the position shown in Figure 50 with the truing device feed set to the desired total amount. There is thus an automatic adjustable re-setting of the truing feed at each retraction of the wheel preparatory to a complete machine cycle.

The turning of the shaft 1089 serves to feed not only the truing mechanism relative to the wheel, but also to feed the wheel slide relative to the work by the amount of the truing. Referring to Figure 7, it will be seen that the shaft 1089 has fixed to its rear end a gear 1120, which meshes through a pinion 1121 on a shaft 1122 with a gear 1123 fixed to the rear end of the shaft 659, by the turning of which the nut 656, which is secured against axial motion relative to the wheel slide 113, is caused to rotate and move axially on the bar 645 and thus to feed the wheel slide. Feed of the truing device relative to the wheel slide is produced by rotation of the shaft 1122. This shaft has a long gear 1125 thereon with which meshes a gear 1126 (see Figure 10) on a shaft 1127 journaled lengthwise of the wheel slide 113. This shaft 1127 has a lead screw portion 1128 on which is threaded a nut member 1130, which is secured to the rear end of the slide 853 which carries the wheel truing mechanism, as previously described.

It will therefore be seen that the amount of wheel feed as determined by the actuation of the feed mechanism at the ends of the traverse of the work carriage, and the amount of truing, are independently adjustable, but that they are so related that at the final stopping position of the wheel, its cutting edge is at a position determining a final size regardless of the particular limits of wheel and truing feed which have been selected.

The operation of the truing devices after the initial stopping of the lay shaft continues until the disk 1032 has rotated to a sufficient extent to bring the dog 1140 (Figure 6), pivoted on the arm 1141 of the bell crank lever 1029, into operative relation to a dog 1142 having a pointed end, this dog being carried by a rock arm 1143 on a rock shaft 1144. The dog 1140 may be held against tilting in either one or the other direction by a stop pin 1141a which may be inserted in either selected of a pair of holes 1141b in the arm 1141, thus to determine which direction of motion of the arm will be effective to rock the arm 1143. This rock shaft 1144 within the machine frame carries a rock arm 1145 (Figure 4) to the lower end of which is pivoted a rod 1150. The opposite end of this rod 1150, as shown in Figure 37, is pivoted to a rock arm 1151 secured to the shaft 518 and acts to rock this shaft 518 to retract the clutch controlling arm 540, thus to permit the lay shaft to complete its half revolution, the spring 522 acting, as soon as the lay shaft has completed its half revolution, to rock the shaft 518 in the opposite direction as soon as the cam roll 521 enters the next depression 580. Thus the truing motion is completed before the lay shaft completes its one-half revolution and initiates the carriage traverse in the opposite direction.

Where two-way grinding is employed each of the two recesses 1065 of the cam member 530 has its left hand end open to permit the dropping of the roll 521 therein, as indicated in Figure 44, but when one-way grinding is desired, one of these stop blocks 1066 is reversed end for end, so that its long end completely fills the left hand portion of the depression 1065, so that the cam roll 521 is prevented from dropping into it during the rotation of the lay shaft one of its half revolutions. This cycle is illustrated in Figure 45. Thus the truing takes place during this half of the lay shaft's rotation, and while it does not take place during the other half rotation when the work carriage is at the other end of its traverse, stopping of the lay shaft before it completes its half revolution insures the continuation of the dwell at that end of the traverse until the truing diamonds have completed their traverse of the wheel faces as determined by the spacing of the truing actuating lugs 1034, whereupon the completion of the half revolution of the lay shaft is permitted.

It is desirable that the speed of rotation of the grinding wheel be reduced during the truing operation from that which it has when grinding. To this end the motor 109 is a variable speed motor and its connections are such that it is normally driven at one of the higher rates of speed selected manually as the wheel becomes smaller toward the higher speeds. The bar 1020, which, when moved into its forward position, causes the truing device to operate, and which is provided with a headed member 1022, as hereinbefore mentioned, impinges on the switch arm 1160 (Fig. 1) of a limit switch 1161 and forces this arm to a position controlling the motor connections to drive the motor 109 at its lowest speed. Retraction of the bar 1020 permits the limit switch arm 1160 to resume its normal position, making connections to drive the motor 109 at the higher rate of speed Means are also provided by which the movement of the truing diamonds in their truing action cannot take place until a truing feed actuation is produced so that it does not take place until truing is actually desired. To this end the shaft 1020 is held in neutral position until the feed motion of the feed bar 1079 takes place. This feed bar 1079 is shown as provided with an extension 1170 equipped with a spring latch 1171, which, when the bar 1079 is rocked downwardly to its normal idle position, extends outwardly of the head 1022, thus preventing the shift of the rod 1020 in a direction outwardly to start the rocking motion of the diamond-carrying shafts. Since the actuation of the feed bar 1079 is determined by the setting of the mechanism, including the position of the filler blocks 1066 on the cam member 530 in accordance with whether truing is desired at one or both ends of the traverse, the actuation of the diamonds is also similarly controlled to take place at either one or both ends of the carriage traverse, but only after the wheel has been fed a predetermined amount toward the work axis, at which time, also, the truing feed begins.

Beside the automatic stopping of the grinding operation when finished size has been reached, as heretofore described, provision may be made for stopping the machine automatically should the traversing carriage for any reason go beyond its desired traverse limit. A limit switch for this purpose is shown at 1180, which is struck by the arm 502 whenever the cam roller 503 is depressed to an abnormal distance by either of the dogs 500 riding too far thereover.

Hob grinding

When grinding certain classes of work, such, for example, as hobs having their teeth arranged in a plurality of circular series rather than in a helical series, or in any other type of work where there are circumferential circular ridges rather than helical ridges, provision is made in accordance with this invention by which the grinding wheel will operate successively in the several peripheral grooves of the work and will be retracted after working in one and the carriage will be fed along one step, whereupon the grinding wheel will be fed into the succeeding groove. This type of traverse feed is therefore intermittent rather than continuous, as is the case when threaded work is being ground, and there is necessary a retraction of the grinding wheel and then a forward feed during each successive stopped position of the carriage during its traverse. This also requires that the grinding wheel be set in a plane transverse to the axis of the work, since there is no lead angle to which the plane of the wheel should conform. Otherwise, the grinding and truing operations take place in accordance with the cycle previously described.

When the work operated upon is a hob where relief of the teeth between the successive flutes is desired, the tap relieving and flute jumping previously described, may also be employed. This mechanism for tap relieving and flute jumping has been previously described when employing the gear boxes shown in Figures 73 and 74. Mechanism for retracting and returning the grinding wheel when passing from one groove to the next, is also shown in Figures 73 and 74. The shaft 750, shown in Figure 74, carries a pinion 1200, which meshes with a gear 1201 on a stub shaft 1202, and fixed to rotate with the gear 1201 on this shaft is a pinion 1203, which meshes with a gear 1204 journaled on a stub shaft 1205. Fixed to rotate with the gear 1204 is a cam 1206 having a peripheral cam groove 1207 therein in which rides a cam follower roll 1208 on a rocker 1209 fixed to a shaft 1210. This rocker 1209 also carries a finger 1211, which engages in a slot 1212 in the end portion of a shift bar 1213, the opposite end of which is connected to the former cam 675, hereinbefore referred to, which acts on the wheel slide controlling lever 649. This former cam is so shaped that through its reciprocation the wheel slide is moved forwardly and backwardly independent of the wheel feed and the truing device feed. When it is not desired to use the tap relieving or flute jumping in connection with this circularly grooved work, the gear wheel 759 is removed from the shaft 760 so that the flute jumping and relieving mechanism is inoperative.

It is also necessary to actuate the work feed carriage traverse in time with this movement of the wheel slide so that the wheel will be presented into successively adjacent grooves of the work during the course of the work traverse. To accomplish this, a different gear arrangement from that shown in the gear box 221 is necessary, and the gear box shown in Figures 69 and 72 with its contents is substituted therefor. The drive shaft 220, which extends into this hob grinding gear box 1250 carries on its inner end a pinion 1251, which meshes with a gear 1252 fixed on a shaft 1253. This gear 1252 also meshes with a gear 1254, which, in turn, meshes with a gear 1255 on the work spindle-actuating shaft 56. The gear 1252 also carries a pin 1260 on which is journaled a roll 1261, this pin and roll serving as the pin and roll of a Geneva motion cooperating with a Geneva wheel 1262 having the roll-receiving slots 1263. This Geneva wheel is carried by a shaft 1264, which as shown best in Figure 72, is journaled in a central partition 1265 in the casing 1250 and carries on its opposite end a gear 1266. This gear 1266 meshes with a gear 1267 fixed to a shaft 1268, which is mounted for adjustable sliding motion in a slot 1269 of a hanger 1270 journaled coaxially with the shaft 1264. Also carried by the shaft 1268 is a pinion 1272, which meshes with a gear 1273 fixed to the inner end of the lead screw shaft 400. The gears 1266, 1267 and 1273, and the pinion 1272, are change gears by which the amount of traverse step by step of the carriage for each rotation of the Geneva wheel may be adjusted in accordance with the spacing of the circumferential ridges on the work. Means are provided for locking the work carriage in its successively stopped positions during its traverse. This lock comprises a roll 1275 of too great diameter to enter fully into the Geneva slots 1263 and which is journaled on a pin 1276 secured to a rock arm 1277 fulcrumed at 1278. This arm 1277 has an extension 1279 thereon to which is secured a pin 1280, which, when the roll 1275 is in locking position in any of the Geneva wheel slots, is in the path of rotation of a cam block 1281 adjustably secured in an annular groove in one face of the gear 1252. When this block 1281 strikes the pin 1280, as the Geneva roll 1260 is just entering one of the Geneva wheel slots, it retracts the locking roll 1275 from the Geneva wheel, thus to free it for its succeeding step by step feed and when the next slot 1263 comes into locking position, the roll 1275 drops thereinto to again lock the Geneva wheel.

Operation

In order to more fully understand the operation of this machine, it will be described with reference to the grinding of straight threaded work. The work is carried between the head and tailstock centers and is rotated at suitable speed by proper adjustment of the speed control mehcanism. The work is also caused to traverse the grinding wheel by rotation of the lead screw 400 and the wheel is adjusted in the proper angular relationship to conform to the lead of the threads to be cut. When the desired limit of traverse is approached, one or the other of the stop dogs 500 strikes on the arm 502 which depresses the rod 508. This connection as described under the heading "Traversing carriage and spindle reverse control mechanism" initiates power rotation of the lay shaft 532. Rotation of this lay shaft acts first to operatively disconnect the power from the carriage traverse mechanism and the spindle rotating mechanism through the lever 336 which actuates the reverse clutches 259 and 260 within the gear box 209. After this lay shaft has completed one-half the revolution, it is stopped automatically through a half revolution clutch arrangement comprising the arcuate depressions 580 in the cam element 530. During the later operation of this half revolution, the reverse direction clutches are thrown to start the traverse of the carriage and the reverse rotation of the work. The rotation of the lay shaft, after the carriage has completed its stroke in either direction, also acts to produce a feed of the wheel to the work, this being done through the cam 600 and the cam follower roll 602, which act through the rocking bar 605 to actuate one or both of the pair of arms 613 and 614, producing a step by step ratcheting of the feed shaft screw 642, depending on whether or not one or two feed dogs are employed in the bar 605. After a predetermined amount of feed has been produced, the wheel is then trued each time the wheel is fed, and the wheel feed is increased by the amount of truing feed through the rotation of the feed screw 655 which is actuated in time with the main feeding motions. The time of start of the truing feed is dependent upon the setting of the truing feed mechanism block 1050 which determines the start of operation of a rock shaft 1057. This then actuates a follower roll 1063 to move it into the path of motion of the edge cam 1064 on the end of the cam member 530 on the lay shaft so that when the shaft 532 rotates, the impingement of this cam member against the cam roll 1063 forces the cam member 530 axially of the lay shaft against the pressure of the springs 534 into the position of Figure 41. When the short end of a filler block 1066 is positioned to face the left hand end of the cam member 530 and when the cam member 530 has been pushed to its right hand position, a cam roll 521 on the stop shaft arm 520 drops into position to unclutch the shaft 545 from the driving gear so as to stop the rotation of the lay shaft approximately 120° after it has been started and before it has reached such an angular position as to start the reverse direction of traverse of the carriage and the reverse direction of rotation of the work.

Previous to the stopping of the lay shaft in this angular position, the truing has been initiated by the impingement of a cam element 1070 (Figure 41) on a cam follower roll 1072 which actuates the rock shaft 1078. This actuates the rock bar 1079, which, through its truing feed-actuating dog 1081, acts to rock the rocker 1082 and through its connections to impart a feed of the truing mechanism through connections previously described.

The truing mechanism drive has also been thrown into operation through the driving clutch mechanism. The actuation of the truing mechanism continues until the load and fire mechanism shown in Figure 4 is actuated by the adjustable stop 1034 which acts, as previously described, to again connect the lay shaft 532 for rotation to complete the half revolution during which the reverse driving connections to the traverse and work rotation have been established, the truing mechanism having been stopped meanwhile. Peculiarities in the control of the wheel feed to accomplish taper grinding, one or two-way grinding, flute jumping, relieving and hob grinding are described under the headings "Wheel actuating mechanism", "Tap relieving", "Flute jumping" and "Hob grinding", respectively, and under the heading "Hob grinding" modifications in the traverse to provide for intermittent rather than continuous traverse motions have been fully described.

From the foregoing description of certain embodiments of this invention, it should be evident to those skilled in the art that various changes and modifications might be made without departing from the spirit or scope of this invention as defined by the appended claims.

I claim:

1. In a grinding machine, a support, a cradle carried by said support for rocking adjustment thereon, a grinding wheel carried by said cradle and having its rotational axis approximately intersecting said cradle axis, said cradle having a slot therethrough, a wheel truing slide on said support extending through said slot for motion toward and from said wheel, and wheel truing mechanism carried by said slide.

2. In a grinding machine, a support, a cradle carried by said support for rocking adjustment thereon, a grinding wheel carried by said cradle and having its rotational axis approximately intersecting said cradle axis, said cradle having a slot therethrough, a wheel truing slide on said support extending through said slot for motion toward and from said wheel, wheel truing mechanism carried by said slide, said support having a tubular hood coaxial with said cradle, and said truing mechanism having a part on which said tubular portion is rockable as said cradle is rocked.

3. In a grinding machine, a support, a cradle carried by said support for rocking adjustment thereon, a grinding wheel carried by said cradle and having its rotational axis approximately intersecting said cradle axis, said cradle having a slot therethrough, a wheel truing slide on said support extending through said slot for motion toward and from said wheel, wheel truing mechanism carried by said slide, said support having a tubular hood coaxial with said cradle, a casing for said truing mechanism having a part on which said tubular portion is rockable as said cradle is rocked, and a packing between said portion and part.

4. In combination, a movable grinding wheel carriage, a truing device slide on said carriage movable in the same linear direction on said carriage as said carriage itself moves, a non-rotatable axially movable bar, a nut threaded on a portion of said bar and rotatably secured to said carriage, means for rotating said nut to move said carriage relative to said bar, a second nut rotatable on another threaded portion of said bar and held against axial motion, means for rotating said second nut to produce axial motion of said bar and thereby to move said carriage, and means for simultaneously moving said slide relative to said carriage and for turning said first-mentioned nut to feed said carriage relative to said bar by the amount of feed of said slide relative to said carriage.

5. In a grinding machine, a work holder, a grinding wheel, means actuable to effect traverse between said work holder and wheel, means biasing said grinding wheel toward said work-holder, means actuable to hold said wheel and work holder retracted from each other during traverse in one direction only to cause the wheel to be inoperative on the work during such direction of traverse, said holding means having parts selectively adjustable to render said holding means inoperative whereby to cause said wheel to be operative on the work during traverse in both directions.

6. In a grinding machine, a work holder, a grinding wheel, means for producing traverse between work on said holder and said wheel, means for effecting relative movement between said wheel and the work transverse to the direction of said traverse, an arm engaging intermediate its ends a portion of said transverse moving means, cam means engageable with opposite end portions of said arm, and means for moving said cam means and arm relatively to impose on said wheel and work relative transverse motions in accordance with the contours of said cam means in addition to the relative transverse motions produced by said transverse moving means.

7. In a grinding machine, a work holder, a grinding wheel, means for producing traverse between work on said holder and said wheel, means for effecting relative movement between said wheel and the work transverse to the direction of said traverse, wheel-truing mechanism, means for feeding said truing mechanism against said wheel and for imparting a relative transverse feeding motion between said wheel and the work corresponding to said truing mechanism feed, and cam means acting through said traverse moving means for modifying the effective transverse movement between said wheel and the work as produced by said transverse moving means and said wheel-truing mechanism transverse feed.

8. In a grinding machine, a work holder, a grinding wheel, means for producing traverse between work on said holder and said wheel, means for effecting relative movement between said wheel and the work transverse to the direction of said traverse, wheel truing mechanism, means for feeding said truing mechanism against said wheel and for imparting a relative transverse feeding motion between said wheel and the work corresponding to said truing mechanism feed, an arm engaging a portion of said transverse moving means, a formed cam engaging said arm, and means for moving said former cam to thereby impose on said wheel and work a relative transverse motion in accordance with the contour of said former cam in addition to the relative transverse motions produced by said transverse moving means and said truing mechanism feed.

9. In a grinding machine, a work holder, a grinding wheel, means for effecting traverse between said wheel and work on said holder, means for producing relative feed and retraction between the wheel and work transverse to the line of traverse, said feed and retraction-producing means including a lever, a member movable to engage and move said lever and means moving said member near to the end of a traverse in one direction to move said lever to withdraw said wheel from the work and there hold said member during the return traverse.

10. In a grinding machine, a work holder, a grinding wheel, means for automatically effecting traverse in opposite directions between said wheel and work on said holder, means for producing relative feed and retraction between the wheel and work transverse to the line of traverse, said feed and retraction-producing means including a lever, means acting on said lever near to the end of a traverse in one direction to withdraw said wheel from the work and there hold it during the return traverse, and means acting on said lever to change the relative positions of said wheel and work transverse to the line of traverse during the first direction of traverse.

11. In a grinding machine, power-driving means, a traversing work carriage, a grinding wheel, wheel truing mechanism, means for traversing said carriage, means timed with said traversing means to actuate said mechanism to true said wheel, and driving connections from said power driving means to said actuating means, said actuating means comprising elements selectively adjustable to cause said truing mechanism to be actuated adjacent to one or to both ends of the traverse.

12. In a grinding machine, a traversing work carriage, a grinding wheel, wheel feeding mechanism, wheel truing mechanism, means for traversing said carriage, means acting automatically for actuating said feed mechanism to feed said wheel toward the work, said feed mechanism having means selectively adjustable to determine whether said feed shall be actuated adjacent to one or the other or adjacent to both ends of the carriage traverse, and means controlled by said feed for actuating said truing mechanism to true said wheel.

13. A grinding machine comprising power actuating means, a traversing carriage, a grinding wheel, wheel-truing mechanism, means for driving said carriage alternately in opposite directions, wheel-truing-mechanism-driving means, driving connections from said power-actuating means to said wheel-truing mechanism driving means, and means for automatically rendering said truing mechanism-driving means operative selectively at either one or at both ends of the carriage traverse.

14. A grinding machine comprising power actuating means, a traversing carriage, a grinding wheel, wheel-truing mechanism, means for driving said carriage alternately in opposite directions, wheel-truing mechanism-driving means, driving connections from said power-actuating means to said wheel-truing mechanism driving means, means for automatically rendering said truing mechanism-driving means operative selectively at either one or both ends of the carriage traverse, and means for adjusting the extent of truing independently at each end.

15. In a grinding machine, a traversing work carriage, a grinding wheel, wheel truing mechanism, means for traversing said carriage, means for feeding said wheel toward the work adjacent to a traversing limit, means effective after a predetermined extent of feed to start said mechanism to true said wheel, means for limiting the extent of truing, and means acting automatically when said carriage is at one limit of traverse and said truing mechanism has reached its truing limit for stopping the operation of said machine.

16. In a grinding machine, a work holder, a grinding wheel, means for producing relative traverse between said wheel and work on said holder, means including a reciprocable member for causing by its reciprocation in one direction a feed motion between said wheel and the work, a rock arm, means actuable adjacent to one end of said traverse to rock said arm in one direction and adjacent to the opposite end of said traverse to rock said arm in the opposite direction, and feed dogs removably secured on said arm on opposite sides of and adjustable toward and from its rocking axis, one of said feed dogs being effective in one direction and the other effective in the opposite direction of rocking of said arm to actuate said reciprocable member in feed direction and with an amplitude dependent on its respective spacing from said axis, whereby feed may be produced selectively at either or both ends of said traverse and independently adjustable in amount.

17. In a grinding machine, a work holder, a grinding wheel, wheel truing mechanism, means for producing relative traverse between said wheel and work on said holder, means selectively operable to produce feed between said wheel and work at one or both ends of such traverse, and means effective after a predetermined extent of such feed to actuate said mechanism to true said wheel whenever said feed is produced.

18. In a grinding machine, a work holder for fluted work, a grinding wheel, means for rotating the work, means for producing relative traverse between said wheel and the work carried by said work holder, means including a lever for effecting feed or retraction between the wheel and work transverse to the traverse direction, means acting at the end of a traverse to actuate said feed and retraction means in feeding direction, means acting on said lever during a traverse and in timed relation to the rotation of the work to effect a grinding relief on the lands between said flutes, and means acting on said lever during a traverse to define the axial contour of the ground work.

19. In a grinding machine, a traversing carriage, a grinding wheel, means for relatively feeding said wheel and work transverse to said traverse, said means being retractible to position said carriage and wheel for the start of a complete machine cycle, wheel-truing mechanism, means acting after a predetermined extent of feed to render said mechanism operative and thereafter to relatively feed said mechanism and said wheel and said wheel and the work both to final predetermined positions, and means acting automatically on the retraction of said wheel and work feeding means to a definite position preparatory to a succeeding machine cycle to reset said truing mechanism feed relative to said wheel to a predetermined adjustable amount.

20. In a grinding machine, a traversing carriage, a grinding wheel, means for feeding said wheel toward work on said carriage, means actuable to retract said feeding means, wheel truing mechanism, means for feeding said mechanism relative to said wheel, means acting after a predetermined extent of feed of said wheel toward the work to feed said mechanism toward said wheel while the feed of said wheel toward the work continues, means for stopping the machine after a predetermined extent of both feeds, a stop limiting the initial position of said mechanism, and means actuated after retraction of said wheel feed to a predetermined extent to produce retraction of said mechanism therewith till said initial mechanism feed position has been reached.

21. A grinding machine comprising a work carriage, a grinding wheel, means including variable speed mechanism for effecting relative traverse in opposite directions between work on said carrier and said wheel, means determining the relative positions of said work and wheel transverse to the traverse direction, and means for selectively adjusting said variable speed traverse mechanism and said determining means to automatically produce grinding of the work in both directions at the same speed of traverse or grinding in only one direction of traverse and at a relatively low speed and a return traverse at a higher speed with the wheel out of contact with the work.

22. A grinding machine comprising a work carriage, means on said carriage for rotatably supporting fluted work, a grinding wheel, means including variable speed mechanism for effecting relative traverse in opposite directions between work on said supporting means and said wheel, variable speed mechanism for rotating said work supporting means at different speeds, means determining the relative positions of said work and wheel transverse to the traverse direction, means for selectively adjusting said variable speed traverse mechanism and said determining means to produce grinding of the work in both directions at the same speed of traverse or grinding in only one direction of traverse and at a relatively low speed and a return traverse at a higher speed with the wheel out of contact with the work, and means acting during said grinding traverse to control said rotating means to rotate said work-supporting means at a relatively high speed when said wheel is presented opposite a flute and at a relatively low speed when said wheel is presentd to a land btween adjacent flutes.

23. A grinding machine comprising a work carriage, means on said carriage for rotatably supporting fluted work, a grinding wheel, means including variable speed mechanism for effecting relative traverse in opposite directions between work on said supporting means and said wheel, variable speed mechanism for rotating said work-supporting means at different speeds, means determining the relative positions of said work and wheel transverse to the traverse direction, means for selectively adjusting said variable speed traverse mechanism and said determining means to produce grinding of the work in both directions at the same speed of traverse or grinding in only one direction of traverse and at a relatively low speed and a return traverse at a higher speed with the wheel out of contact with the work, means acting during said grinding traverse to contact said rotating means to rotate said work supporting means at a relatively high speed when said wheel is presented opposite a flute and at a relatively low speed when said wheel is presented to a land between adjacent flutes, and means acting on said determining means during the grinding of each land to change the relative positions of said work and wheel in a manner to cause relief on said lands.

24. In a machine for grinding fluted work having peripheral elements in circular array, a work carriage, a rotary work holder on said carriage, a grinding wheel, means for moving said carriage step by step axially of the work corresponding to the axial spacing of said work elements, means acting to present and then withdraw said wheel between such step by step motions, means for rotating said work holder at either of two speeds, and means causing such rotation to be at high speed when said wheel is opposite to a flute and at the low speed when said wheel is grinding the lands between adjacent flutes.

25. In a machine for grinding fluted work having peripheral elements in circular array, a work carriage, a rotary work holder on said carriage, a grinding wheel, means for moving said carriage step by step axially of the work corresponding to the axial spacing of said work elements, means acting to present and then withdraw said wheel between such step by step motions, means for rotating said work holder at either of two speeds, means causing such rotation to be at the higher speed when said wheel is opposite to a flute and at the lower speed when said wheel is grinding the lands between adjacent flutes, and means producing a feed motion while said wheel is grinding said lands in a manner to produce relief thereof.

26. In a grinding machine, work-holding mechanism for holding fluted work, a grinding wheel, means for producing relative traverse between said wheel and the work, means selectively actuable to move said wheel and work transversely of said traverse during said traverse to grind a taper, and means selectively actuable independently of said first mentioned selective means for producing such transverse movement during the times said wheel is operating on the lands between successive flutes to effect relief thereon.

27. In a grinding machine, a grinding wheel, a two-speed electric motor for rotating said wheel, control mechanism normally conditioned to cause said motor to rotate at the higher speed, wheel truing mechanism, means actuable to render said mechanism operative, and means acting automatically when said mechanism is rendered operative to condition said control means to cause said motor to rotate at the lower speed.

28. In combination in a machine having relatively movable members, one of said members comprising a tool, and the other of said members comprising a work holder, a traversing carriage for supporting one of said members for movement relative to the other member, means for traversing said carriage including a lay shaft, means actuated adjacent to each limit of carriage traverse for starting the rotation of said lay shaft, means actuated by such rotation of said lay shaft for stopping and then reversing the direction of traverse of said carriage, and means then acting to stop the rotation of said lay shaft.

29. In a grinding machine, a traversing work carriage, a grinding wheel, wheel-truing mechanism, means for traversing said carriage including a reversing mechanism, power means for actuating said reversing mechanism, means controlled by said carriage adjacent to its traverse limits for starting said power means, means actuated at selected times by said power means for operating said truing mechanism and for stopping said power means with said reversing mechanism in neutral until the completion of the truing operation, means acting on the completion of the truing operation to restart said power means to reverse said reversing means, and means automatically operative when reversal has been effected for stopping said power means.

30. In a grinding machine, a traversing work carriage, a grinding wheel, wheel-truing mechanism, means for traversing said carriage, a lay shaft, means actuated adjacent to each limit of carriage traverse for starting the rotation of said lay shaft, means actuated by rotation of said lay shaft to disconnect said traversing means from said carriage and then to establish reverse direction driving connections therebetween, means actuated by rotation of said lay shaft at predetermined times to actuate said truing mechanism, means actuated whenever said truing mechanism is actuated to prevent sufficient rotation of said lay shaft to effect the establishment of said reverse direction driving connections until after truing has been completed, and means for automatically stopping the rotation of said lay shaft after such reverse driving connections have been established.

31. In a grinding machine, a traversing work carriage, a grinding wheel, means for feeding said wheel toward work on said carriage, wheel truing mechanism, means for traversing said carriage, a lay shaft, a cam axially movable but held from rotation with said lay shaft, means actuated adjacent to each limit of carriage traverse for starting the rotation of said lay shaft, means actuated by the rotation of said lay shaft to disconnect said traversing means from said carriage and then to establish reverse driving connections therebetween, means actuated by said cam after a predetermined extent of angular motion sufficient to establish such reverse driving connections to stop the rotation of said lay shaft, means effective after a predetermined extent of feed of said wheel to cause said truing mechanism to become operative, means then effective to cause axial motion of said cam, means responsive to such axial motion to stop the rotation of said lay shaft between the disconnection of said traversing means and carriage and the establishment of such reverse driving connections, and means actuated on the completion of a predetermined extent of wheel truing to start the rotation of said lay shaft to complete said predetermined extent of angular motion of said cam during which said reverse carriage driving connections are established.

32. In combination, a grinding wheel, a wheel-truing device, rotary power means including slip connections for moving said wheel-truing device to dress the wheel, and adjustable stops limiting the extent of motion of said device, whereby further actuation of said power means after said device has reached a limit results in slipping of said connections.

33. In combination, a rotary shaft, a cam slidably but non-rotatably carried by said shaft, cam elements of less than the axial length of said cam located on its periphery, cam followers for said elements, means for moving said cam axially of said shaft to thereby bring said elements into or out of position to act on said followers, a tool, a work holder, means for relatively moving said tool and holder to cause said tool to operate on work held by said holder, means acting in time with such relative movement for rotating said shaft, and means controlled by said followers for determining a cycle of operation of said moving means.

34. In combination, a rotary shaft, a cam slidably but non-rotatably carried by said shaft, cam elements of less than the axial length of said cam located on its periphery, cam followers for said elements, a cam element on one end of said cam, means movable into and out of the path of said end cam element to cause rotation of said cam element when said means is in said path to move said cam axially of said shaft to thereby change the setting of said peripheral cam elements with relation to their respective followers, a grinding wheel, a work holder, a wheel truing mechanism, means for relatively moving said wheel and holder to grind the work, means for relatively moving said truing mechanism and wheel to effect truing of the wheel, means acting in time with such relative movements to rotate said shaft, and means actuated by said followers determining a cycle of operations of said relative moving means.

35. In combination, a rotary shaft, a cam carried by said shaft, said cam having a peripheral depression therein arranged axially thereof, a cam follower riding on said periphery, a filler piece of less length than said depression, means for securing said filler piece selectively in said depression in position to prevent or to allow said follower to pass into said depression depending on the position of said filler piece, a tool, a work holder, means for relatively moving said tool and holder to produce relative traverse between said tool and work on said holder, means for feeding said tool relative to the work, means for rotating said shaft at the end of each traverse, and means actuated by said cam follower when it rides into said depression to actuate said feeding means.

RALPH E. FLANDERS.